(12) United States Patent
Yung

(10) Patent No.: US 6,728,296 B1
(45) Date of Patent: Apr. 27, 2004

(54) DIRECT SEQUENCE SPREAD SPECTRUM SYSTEM WITH ENHANCED FORWARD ERROR CORRECTION CODE FEATURE

(75) Inventor: Raymond H. M. Yung, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/427,041

(22) Filed: Oct. 19, 1999

(51) Int. Cl.[7] .............................................. H04B 1/707
(52) U.S. Cl. ........................ 375/141; 375/144; 375/143
(58) Field of Search ................................. 375/141, 143, 375/146, 147, 144, 148, 152; 370/320, 335, 342, 441

(56) References Cited

U.S. PATENT DOCUMENTS

| | | | | | |
|---|---|---|---|---|---|
| 5,568,472 A | * | 10/1996 | Umeda et al. | ............... | 370/342 |
| 5,729,570 A | * | 3/1998 | Magill | ........................ | 370/204 |
| 6,078,576 A | * | 6/2000 | Schilling et al. | ............ | 370/335 |
| 6,262,971 B1 | * | 7/2001 | Schilling | .................... | 370/208 |
| 6,310,907 B1 | * | 10/2001 | Tsujimoto | .................... | 375/141 |
| 6,353,627 B1 | * | 3/2002 | Schilling | .................... | 375/130 |
| 6,356,528 B1 | * | 3/2002 | Lundby et al. | ............. | 370/209 |

* cited by examiner

Primary Examiner—Don N. Vo
(74) Attorney, Agent, or Firm—Mintz Levin Cohn Ferris Glovsky & Popeo

(57) ABSTRACT

A direct sequence spread spectrum system in which a plurality of substantially redundant second blocks are derived from a first block of data. Each of the second blocks is spread using a distinct spreading sequence, and one or more signals representing each of the spread blocks is modulated and transmitted over a wireless interface. The transmitted one or more signals are received, and estimates of one or more of the second blocks derived therefrom. The first block is then estimated from one or more of the estimated second blocks.

37 Claims, 26 Drawing Sheets

| SYSTEM | VALID CDMA FREQUENCY ASSIGNMENTS | TRANSMITTER FREQUENCY ASSIGNMENT (MHz) | |
|---|---|---|---|
| | | MOBILE | BASE |
| A* (1 MHz) | ///// | 824.040<br>824.670 | 869.040<br>869.670 |
| | CDMA | 824.700<br>825.000 | 869.700<br>870.000 |
| A (10 MHz) | CDMA | 825.030<br><br><br>834.330 | 870.030<br><br><br>879.330 |
| | ///// | 834.360<br>834.990 | 879.360<br>879.990 |
| B (10 MHz) | ///// | 835.020<br>835.650 | 880.020<br>880.650 |
| | CDMA | 835.680<br><br>844.320 | 880.680<br><br>889.320 |
| | ///// | 844.350<br>844.980 | 889.350<br>889.980 |
| A' (1.5 MHz) | ///// | 845.010<br>845.640 | 890.010<br>890.640 |
| | CDMA | 845.670<br>845.820 | 890.670<br>890.820 |
| | ///// | 845.850<br>846.480 | 890.850<br>891.480 |
| B' (2.5 MHz) | ///// | 846.510<br>847.140 | 891.510<br>892.140 |
| | CDMA | 847.170<br>848.310 | 892.170<br>893.310 |
| | ///// | 848.340<br>848.970 | 893.340<br>893.970 |

FIG. 5

| BLOCK DESIG-NATOR | VALID CDMA FREQUENCY ASSIGNMENTS | TRANSMIT FREQUENCY BAND (MHz) | |
|---|---|---|---|
| | | PERSONAL STATION | BASE STATION |
| A (1.5 MHz) | NOT VALID<br>VALID<br>COND. VALID | 1850.000-1851.200<br>1851.250-1863.750<br>1863.800-1864.950 | 1930.000-1931.200<br>1931.250-1943.750<br>1943.800-1944.950 |
| D (5 MHz) | COND. VALID<br>VALID<br>COND. VALID | 1865.000-1866.200<br>1866.250-1868.750<br>1868.800-1869.950 | 1945.000-1946.200<br>1946.250-1948.750<br>1948.800-1949.950 |
| B (15 MHz) | COND. VALID<br>VALID<br>COND. VALID | 1870.000-1871.200<br>1871.250-1883.750<br>1883.800-1884.950 | 1950.000-1951.200<br>1951.250-1963.750<br>1963.800-1964.950 |
| E (5 MHz) | COND. VALID<br>VALID<br>COND. VALID | 1885.000-1886.200<br>1886.250-1886.750<br>1888.800-1889.950 | 1965.000-1966.200<br>1966.250-1968.750<br>1968.800-1969.950 |
| F (5 MHz) | COND. VALID<br>VALID<br>COND. VALID | 1890.000-1891.200<br>1891.250-1893.750<br>1893.800-1894.950 | 1970.000-1971.200<br>1971.250-1973.750<br>1973.800-1974.950 |
| C (15 MHz) | COND. VALID<br>VALID<br>NOT VALID | 1895.000-1896.200<br>1896.250-1908.750<br>1908.800-1909.950 | 1975.000-1976.200<br>1976.250-1988.750<br>1988.800-1989.950 |

FIG. 6

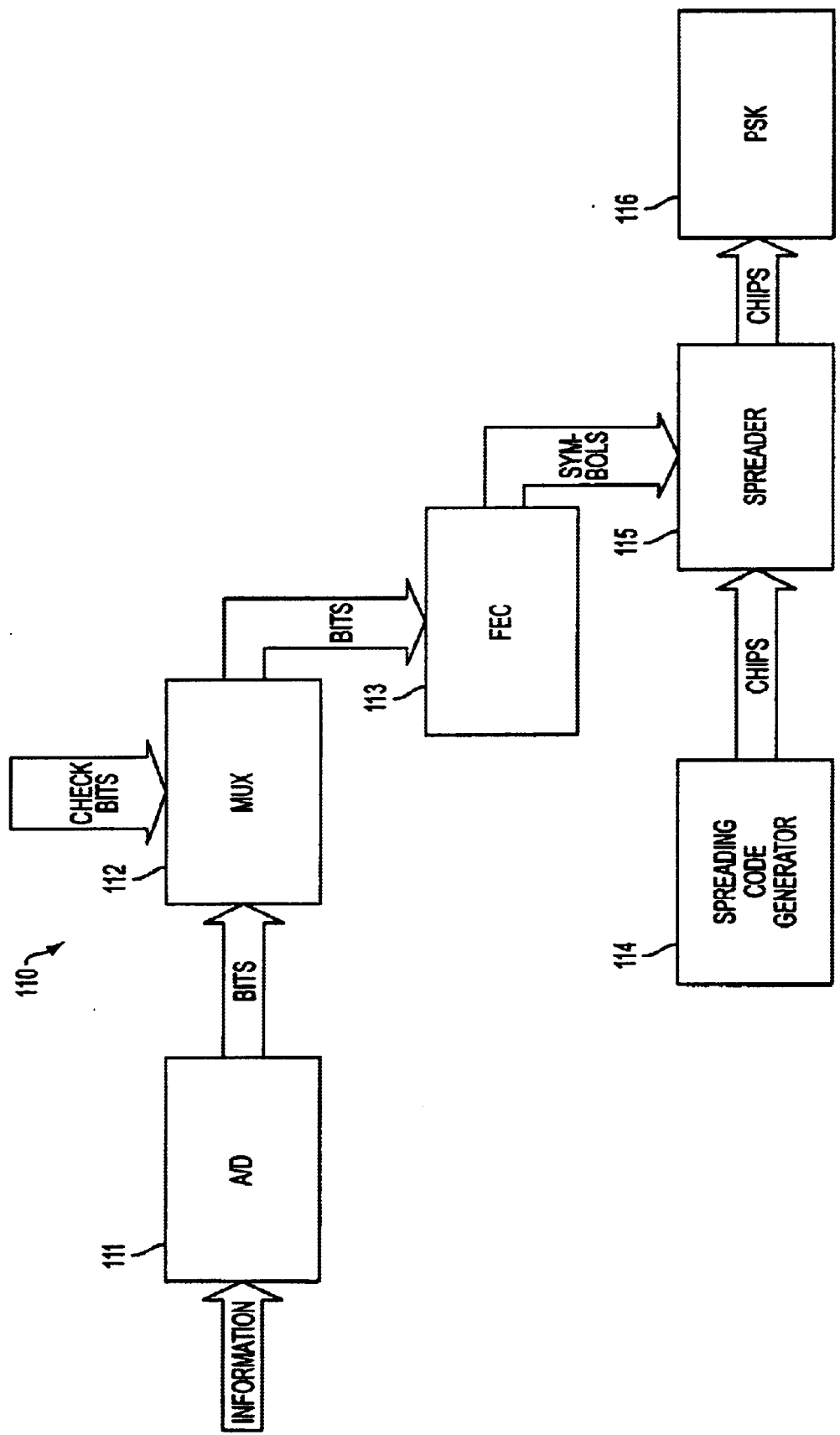

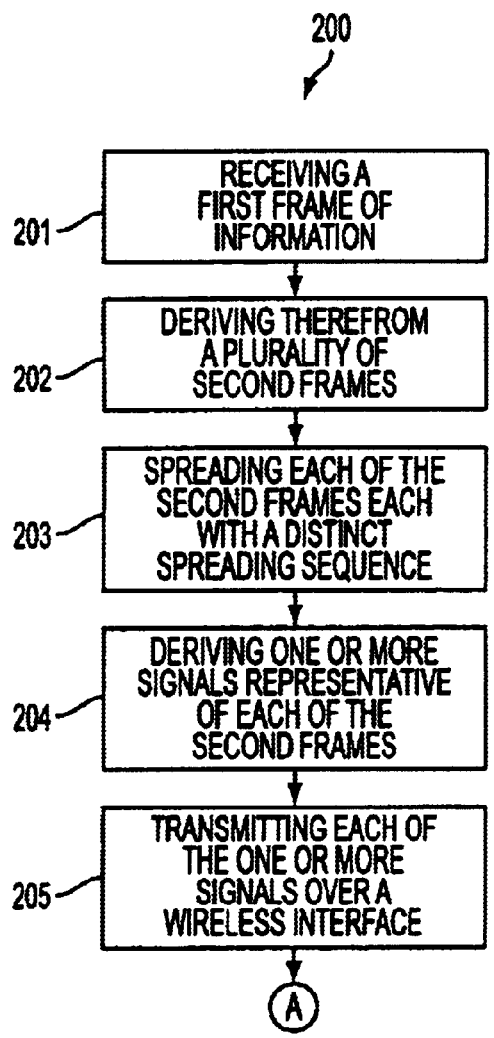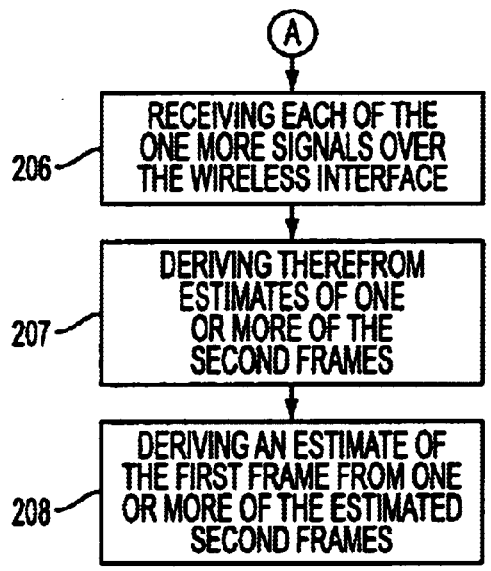
FIG. 19A
FIG. 19B

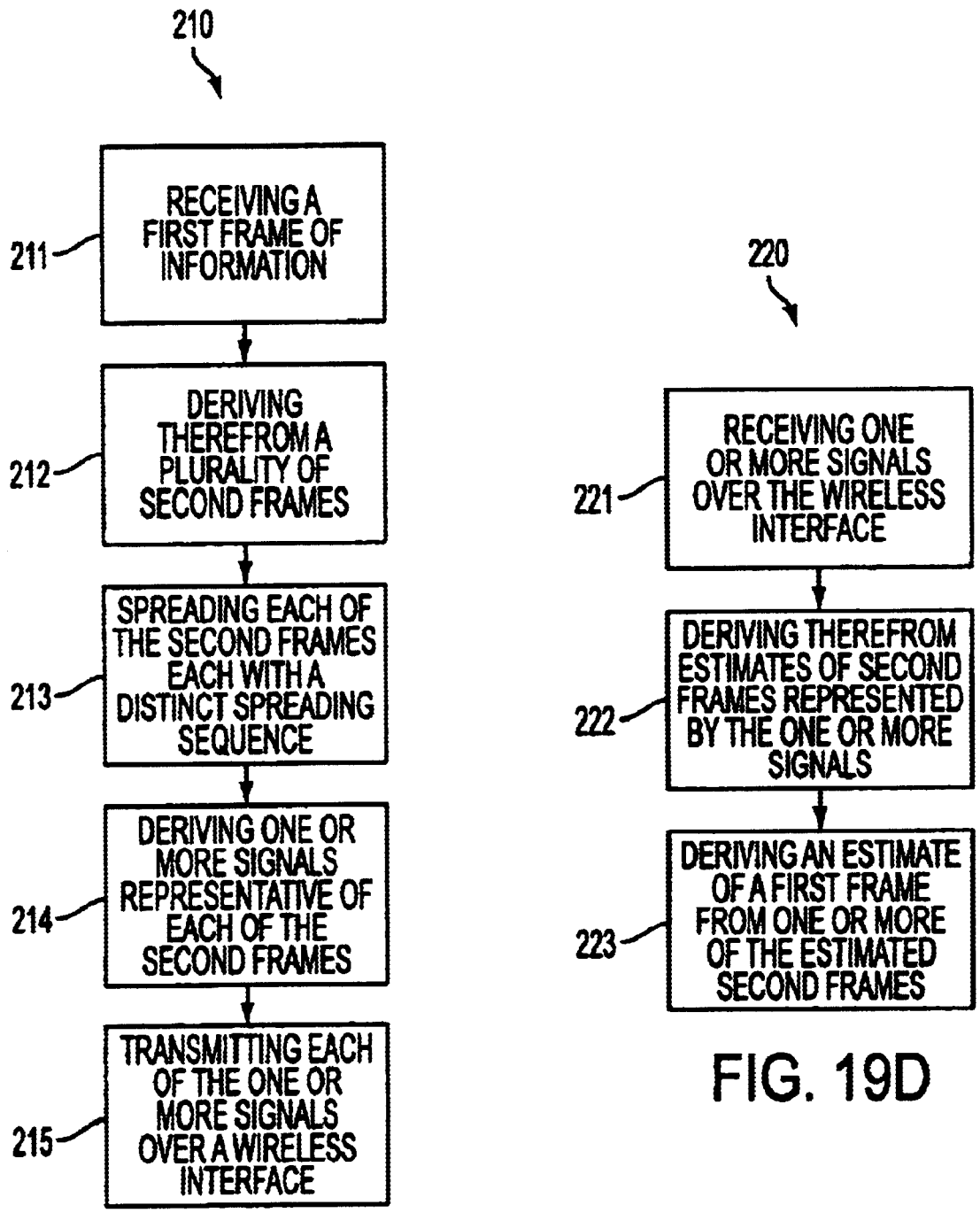

DIRECT SEQUENCE SPREAD SPECTRUM SYSTEM WITH ENHANCED FORWARD ERROR CORRECTION CODE FEATURE

BACKGROUND OF THE INVENTION

1. Field of the Invention

The field of the invention is direct sequence spread spectrum systems, and more specifically, direct sequence spread spectrum systems in which traffic and forward error correction codes relating thereto are transmitted in parallel over separate channels.

2. Background

Wireless communication systems are an integral component of the ongoing technology revolution. Mobile radio communication systems, such as cellular telephone systems, are evolving at an exponential rate. In a cellular system, a coverage area is divided into a plurality of "cells". A cell is the coverage area of a base station or transmitter. Low power transmitters are utilized, so that frequencies used in one cell can also be used in cells that are sufficiently distant to avoid interference. Hence, a cellular telephone user, whether mired in traffic gridlock or attending a meeting, can transmit and receive phone calls so long as the user is within a "cell" served by a base station.

Cellular networks provide mobile communications ability for wide areas of coverage. The networks essentially replace the traditional wired networks for users in large areas. But wireless technology can also be used to replace smaller portions of the traditional wired network.

Each home or office in the industrialized world is equipped with at least one phone line. Each line represents a connection to the larger telecommunications network. This final connection is termed the local loop and expenditures on this portion of the telephone network account for nearly half of total expenditures. Wireless technology can greatly reduce the cost of installing this portion of the network in remote rural areas historically lacking telephone service, in existing networks striving to keep up with demand and in emerging economies trying to develop their telecommunications infrastructure.

Another area in which wireless technology is aiding telecommunications is in the home where the traditional telephone handset is being replaced by the cordless phone system. A cordless phone system is in many ways a mini version of a WLL system. Cordless handsets in the home allow for untethered use of the handset enabling the user the freedom to move about as long as they stay in range of the base station.

Wireless systems can be classified according to the method used to provide access to multiple users seeking to utilize the system in parallel. In Frequency Division Multiple Access (FDMA) systems, the available frequency spectrum is divided into multiple narrow bands, each of which defines a separate channel. Different users are allocated different bands. Since the bands are separated by frequency, multiple users can access the system in parallel.

In Time Division Multiple Access Systems (TDMA), the available frequency spectrum is divided into multiple narrow bands, and each band is in turn divided into multiple time slots. A channel is defined as a particular time slot within one of the frequency bands. Again, since the channels are separated in time, or time and frequency as the case may be, multiple users can access the system in parallel.

In Code Division Multiple Access (CDMA) or Direct Sequence. Spread Spectrum (DSSS) systems, channels are defined by complementary, orthogonal or pseudo-random spreading sequences or codes. The spreading sequence has a frequency much higher than that of a user's information signal. Each user is assigned a unique spreading sequence. At the transmitter, the user's information signal is multiplied by the spreading sequence assigned to the user. Since the frequency of the spreading sequence is much higher than that of the user's information signal, the bandwidth of the information signal is effectively spread by this action.

The spread signals for each of the users are then simultaneously or concurrently transmitted over the same wideband frequency spectrum. As the receiver, each user's information signal is retrieved from the received signal by multiplying the received signal by the spreading sequence for the user, and then integrating and sampling the product. Since the spreading sequences are orthogonal or pseudo-random, each user's information signal can be retrieved from the same received signal.

A block diagram of a transmitter 110 in a DSSS system is depicted in FIG. 7. A user's analog information signal is input to A/D converter 111, which digitizes the signal into bits. A block or frame of bits is then input to multiplexor 112, which adds error detection or check bits, such as Cyclic Redundancy Check (CRC) bits, to the frame. The frame of bits, including the check bits, is then input to Forward Error Correction (FEC) coding block 113, which encodes group of bits into codewords using one of the many known FEC coding schemes, such as convolutional coding. Typically, a group of bits is translated into one codeword. Thus, the coder 113 typically introduces redundancy into the system. The FEC symbols are used at the receiver to perform error correction.

The symbols from the FEC coder 113 are then input to spreader 115. A unique spreading sequence for a user is generated by spreading code generator 114. The sequence, which comprises a series of chips, is input to the spreader 115. The spreader then spreads in frequency the codeword from FEC coder 113. Typically, the spreader performs this function by multiplying or XORing the symbols from coder 113 and the spreading sequence from generator 114.

Since the frequency of the spreading sequence is typically much greater than that of the information sequence, the effect of this process is to convert the information signal from a narrowband signal, depicted in FIG. 9 with identifying numeral 130, to a wideband signal, depicted in FIG. 9 with identifying numeral 131.

An advantage of a DSSS or CDMA system compared to narrowband systems, such as FDMA or TDMA, is its ability to withstand interference from a jamming signal. This property is illustrated in FIG. 9, which illustrates an interfering jammer 132. As can be seen, the effect on a narrowband signal 130 occupying the same or overlapping spectrum as the jammer is quite severe, whereas the effect on the wideband signal 131 is relatively minor.

The processing gain is a measure of the ability of a DSSS system to withstand interference from a jammer. Mathematically, it is given by $W/R_B$, where W is the bandwidth of the spread signal, and $R_B$ is the bit rate of the incoming information signal. In the case in which the chip rate, $R_c$, of the spreading sequence is much greater than the bit rate $R_B$, the processing gain is approximately equal to $R_c/R_B$.

The coding gain of a system employing a particular form of error detection or correction coding is the amount (in dB) of reduction of $E_b/N_o$, the energy per bit divided by the noise density, that can be achieved at a given bit error rate (BER)

by virtue of the coding. FIG. 15 illustrates the shift in the plot of $E_b/N_o$ which results from implementing a certain error detection or correction code. The amount Δ (CG) of shift at a given BER is the coding gain.

In current DSSS systems, a problem is that there is a tradeoff between processing gain and coding gain such that some processing gain has to be sacrificed in order to achieve an improvement in coding gain, and vice-versa. The reason is that the achievement of coding gain requires the addition of redundancy into the system on the incoming information sequence, and the addition of this redundancy necessitates an increases in the incoming information bit rate, $R_B$, in order to keep the throughput of the system the same. This increase in the information bit rate results in a decrease in the processing gain.

Another problem is that, due to limitations imposed by the frame structure, the class of FEC coding schemes which can be employed in such systems is limited.

Another problem with current DSSS systems is that there is a lack of robustness in responding to changing physical channel conditions. The reason is that the FEC coding scheme in such systems is relatively fixed and selected to deal with the worst case scenario. Therefore, when the performance of the physical channel exceeds the worst case scenario, the system is unable to respond with a less redundant FEC coding scheme. The result is that an excessive degree of redundancy is added to the system.

Moreover, efforts to dynamically respond to changing channel conditions with updated FEC coding schemes have been fraught with problems. In one such effort, a changing channel condition is detected, and, responsive thereto, an updated FEC coding scheme is selected and communicated to the receiver through a control channel in parallel with the traffic channel. The problem with this scheme is that there is no ability to respond to the changing channel condition if the control channel is busy or otherwise unavailable or becomes unreliable. Another problem is that the need to maintain a control channel decreases the number of traffic channels which can be maintained.

Accordingly, there is a need for a direct sequence spread spectrum system which overcomes the disadvantages of the prior art.

SUMMARY OF THE INVENTION

In accordance with the purpose of the invention as broadly described herein, there is provided a direct sequence spread spectrum wireless communication system comprising: a transmitter for (a) receiving a first block of data, (b) deriving therefrom a plurality of substantially redundant second blocks, (c) spreading each of the second blocks, each with a distinct spreading sequence, (d) deriving one or more signals representative of each of the second blocks, and (e) transmitting each of the one or more signals over a wireless interface; and a receiver for (a) receiving each of the one or more signals as transmitted over the wireless interface, (b) deriving therefrom estimates of one or more of the second blocks, and (c) deriving an estimate of the first block from one or more of the estimated second blocks. In one implementation, the second blocks is smaller than the first block. In other implementations, it can be larger than, or equal in size to the first block. In one implementation example, the blocks are frames.

There is also provided a transmitter configured for (a) receiving a first block of data, (b) deriving therefrom a plurality of substantially redundant second blocks, (c) spreading each of the second blocks, each with a distinct spreading sequence, (d) deriving therefrom one or more signals representative of each of the second blocks, and (e) transmitting each of the one or more signals over a wireless interface.

There is further provided a receiver configured for (a) receiving one or more signals representative of a plurality of substantially redundant second blocks over a wireless interface, (b) deriving therefrom estimates of one or more of the second blocks, and (c) deriving an estimate of a first block from one or more of the estimated second blocks.

A method for transmitting information over a wireless interface is also provided. In one embodiment, the method comprises the steps of: receiving a first block of data; deriving therefrom a plurality of substantially redundant second blocks; spreading each of the second blocks, each with a distinct spreading sequence; deriving therefrom one or more signals representative of each of the second blocks; transmitting each of the one or more signals over a wireless interface; receiving each of the one or more signals over the wireless interface; deriving therefrom estimates of one or more of the second blocks; and deriving an estimate of the first block from one or more of the estimated second blocks.

In a second embodiment, a method of transmitting information over a wireless interface comprises the following steps: receiving a first block of data; deriving therefrom a plurality of substantially redundant second blocks; spreading each of the second blocks, each with a distinct spreading sequence; deriving therefrom one or more signals representative of each of the second blocks; and transmitting each of the one or more signals over a wireless interface.

Also provided is a method of receiving information over a wireless interface comprising the following steps: receiving over a wireless interface one or more signals representative of a plurality of substantially redundant second blocks; deriving therefrom estimates of one or more of the second blocks; and deriving an estimate of a first block from one or more of the estimated second blocks.

BRIEF DESCRIPTION OF THE DRAWINGS

FIG. 5 is the United States cellular frequency allocations.

FIG. 6 is the United States PCS frequency allocations.

FIG. 7 is a block diagram of a transmitter in a direct sequence spread spectrum (DSSS) system.

FIGS. 19A–19B illustrate a first embodiment of a method of transmitting information over a wireless interface in accordance with the subject invention.

FIG. 19C illustrates an embodiment of a method of receiving information over a wireless interface in accordance with the subject invention.

FIG. 19D illustrates a second embodiment of a method of transmitting information over a wireless interface in accordance with the subject invention.

DETAILED DESCRIPTION OF THE PREFERRED EMBODIMENTS

1. First Example Environment

Figure 1:
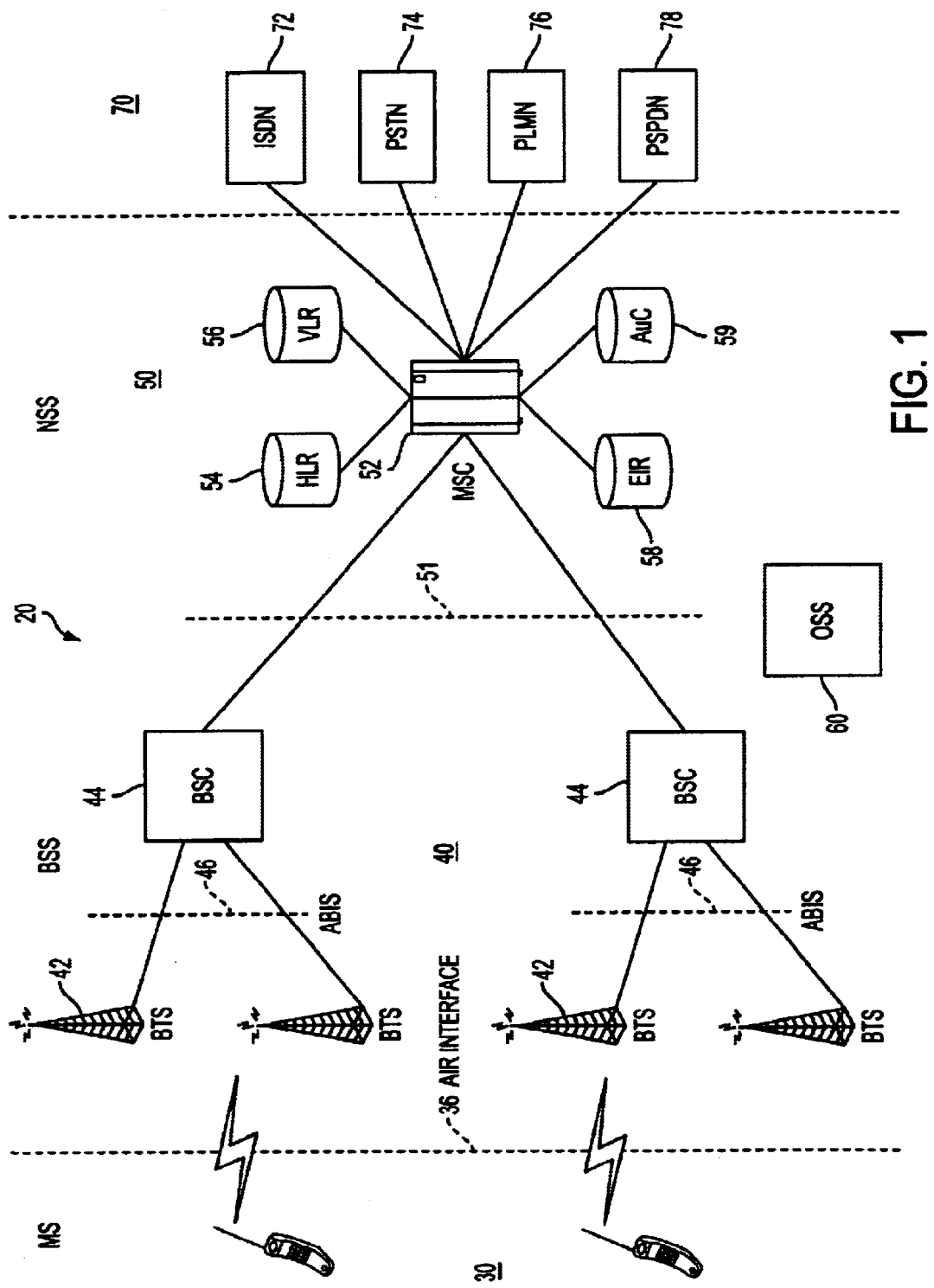
FIG. 1 illustrates one example implementation of a cellular network.

One example environment in which the subject invention may be beneficially employed is wireless cellular network. The architecture of one implementation of a cellular network 20 is depicted in block form in FIG. 1. The network 20 is divided into four interconnected components or subsystems: a Mobile Station (MS) 30, a Base Station Subsystem (BSS) 40, a Network Switching Subsystem (NSS) 50 and an Operation. Support Subsystem (OSS) 60. Generally, a mobile station is the mobile equipment or phone carried by the user. And a base station subsystem interfaces with multiple mobiles to manage the radio transmission paths between the mobiles and network subsystem. In turn the network subsystem manages system-switching functions and facilitates communications with other networks such as the PSTN and the ISDN. The operator support system facilitates operation and maintenance of the network.

Mobiles communicate with the base station subsystem across a standardized radio air interface 36. A base station subsystem is comprised of multiple base transceiver stations (BTS) 42 and base station controllers (BSC) 44. A base transceiver station is usually in the center of a cell and consists of one or more radio transceivers with an antenna. It establishes radio links and handles radio communications over the air interface with mobile stations within the cell. The transmitting power of the transceiver defines the size of the cell. Each base station controller manages transceivers. The total number of transceivers per a particular controller could be in the hundreds. The transceiver-controller communication is over a standardized "Abis" interface 46. The controller allocates and manages radio channels and controls handovers of calls between its transceivers.

The controllers, in turn, communicate with network subsystem 50 over a standardized interface 51. For example, in a GSM system, the interface uses an SS7 protocol and allows use of base stations and switching equipment made by different manufacturers. A Mobile Switching Center (MSC) 52 is the primary component of the network switching subsystem 50. The mobile switching center manages communications between mobile subscribers and between mobile subscribers and public networks 70. Examples of public networks 70 that the mobile switching center may interface with include Integrated Services Digital Network (ISDN) 72, Public Switched Telephone Network (PSTN) 74, Public Land Mobile Network (PLMN) 76 and Packet Switched Public Data Network (PSPDN) 78.

The mobile switching center interfaces with four databases to manage communication and switching functions. A Home Location Register (HLR) 54 contains details on each subscriber residing within the area served by the mobile switching center. A Visitor Location Register (VLR) 56 temporarily stores data about roaming subscribers within a coverage area of a particular mobile switching center. An Equipment Identity Register (EIR) 58 contains a list of mobile equipment. Equipment that has been reported as lost or stolen is stored on a separate list of invalid equipment that allows identification of subscribers attempting to use such equipment. An Authorization Center (AuC) 59 stores authentication and encryption data and parameters that verify a subscriber's identity.

In one example, the air interface 36 is compliant with the IS-95A standard, Protocol Revision 2. In another example, it is compliant with the ANSI J-STD-008 standard. In a third example, it is complaint with the TIA/EIA-95 standard, Protocol Revision 4 (sometimes referred to as IS-95B), which includes IS-95A, TSB-74, and ANSI J-STD-008. Each of these standards define CDMA systems, commercial embodiments of which include cdmaOne™ and cdma2000™ systems.

Figure 10A:
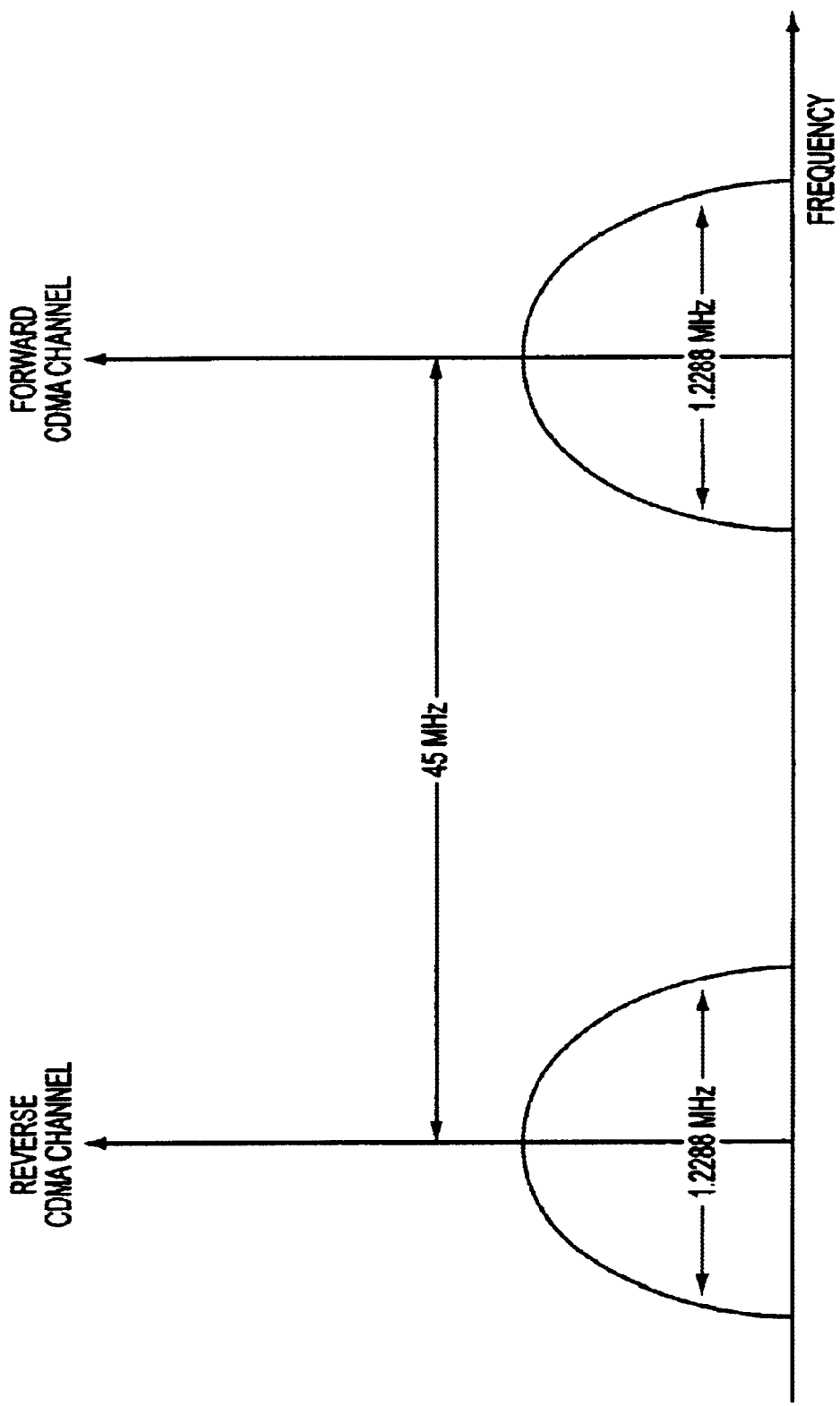
FIG. 10A illustrates the transmit and receive channel spacing in the United States cellular spectrum.

The FCC has divided the so-called cellular spectrum (about 820–900 MHz) into the A and B bands as illustrated in FIG. 5. Supplemental A', B', and A* bands are also defined as illustrated in the figure. Within this spectrum, a physical CDMA channel has a bandwidth of 1.2288 MHz. To support full-duplex communication, a physical CDMA channel includes a reverse channel (from the mobile to the lo base station), and a forward channel (from the base station to the mobile). In the cellular spectrum, the forward and reverse channels separated by 45 MHz, as illustrated in FIG. 10A.

The cellular spectrum is such that valid physical CDMA channel assignments are possible within only portions of the A, B, A', B', and A* bands. The portions of these bands in which valid physical channel assignments are possible is illustrated in FIG. 5.

Figure 10B:
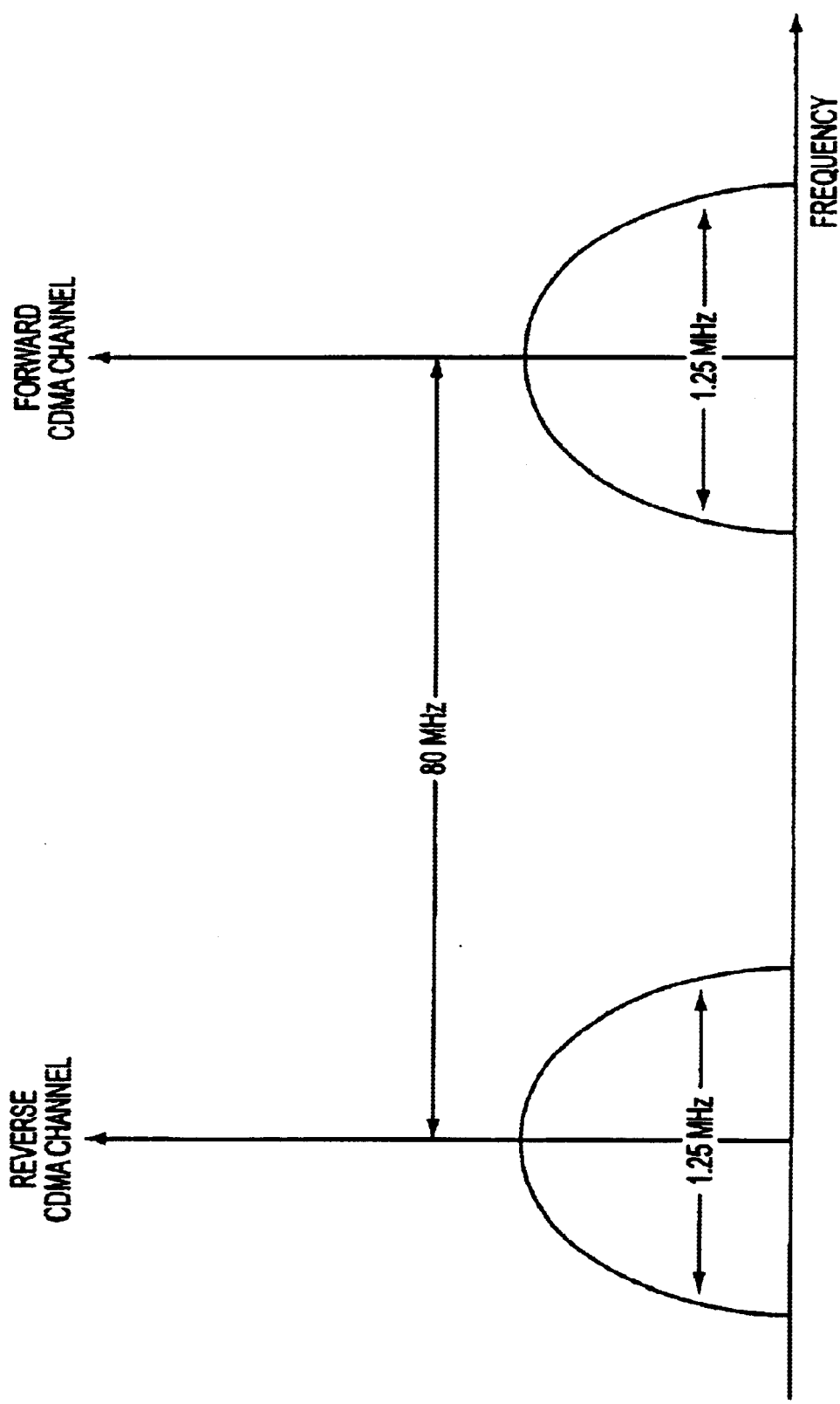
FIG. 10B illustrates the transmit and receive channel spacing in the United States PCS spectrum.

The FCC has also divided up the so-called PCS spectrum (about 1850–1990 MHz) into the A, B, C, D, E, and F blocks as illustrated in FIG. 6. Within this spectrum, a physical CDMA channel has a bandwidth of 1.25 MHz. Again, to support full-duplex communication, a physical CDMA channel includes a reverse channel and a forward channel which, as illustrated in FIG. 10B, are separated by 80 MHz.

The PCS spectrum is such that valid physical CDMA channel assignments are possible over only portions of the A, B, C, D, E, and F blocks. The portions of these blocks in which valid physical channel assignments are possible is illustrated in FIG. 6.

In a CDMA system, as discussed, multiple users can access the same physical channel through orthogonal or pseudo-random spreading sequences which define logical channels within the physical channel. A user is assigned a unique spreading sequence, and the spreading sequence is then multiplied or XORed with the user's information sequence. This process is known as direct sequence spreading in contrast to frequency hopping. That is why CDMA systems are sometimes known as direct sequence spread spectrum (DSSS) systems.

Since the frequency of the spreading sequence is much greater than that of the user's information bits, the effect is to expand the bandwidth of the user's information bits to that of the physical channel, i.e., 1.2288 MHz in the cellular spectrum, and 1.25 MHz in the PCS spectrum.

In current commercial CDMA systems, the spreading sequences which are used in the forward and reverse links differ. In the forward link (from the base station to the mobile), the spreading sequences are taken from a set of orthogonal codes called Walsh codes of length 64. However, in the reverse link (from the mobile to the base station), the spreading sequences are time-shifted versions of a pseudo-random noise (PN) code of length 42. The PN code is such that time-shifted versions thereof exhibit very little correlation with each other.

It should be appreciated that it is also possible to employ complementary spreading sequences with both good auto- and cross correlation properties in order to avoid substantial mutual interference and the ensuing errors which could result when despreading the composite sequence. At present, good complementary sequences exist for moderate sequence length, i.e., those sequence lengths of about 10 or more.

Moreover, the complementary, orthogonal, or pseudo-random sequences may generally be multi-level. In other words, for a 4 level sequence, the sequence elements could be $\{-2,-1,1,2\}$; and for an 8 level sequence, the sequence elements could be $\{-4,-3,-2,-1,1,2,3,4\}$. This is in contrast to a 2-level sequence in which the values could be $\{-1,1\}$.

Figure 11A:
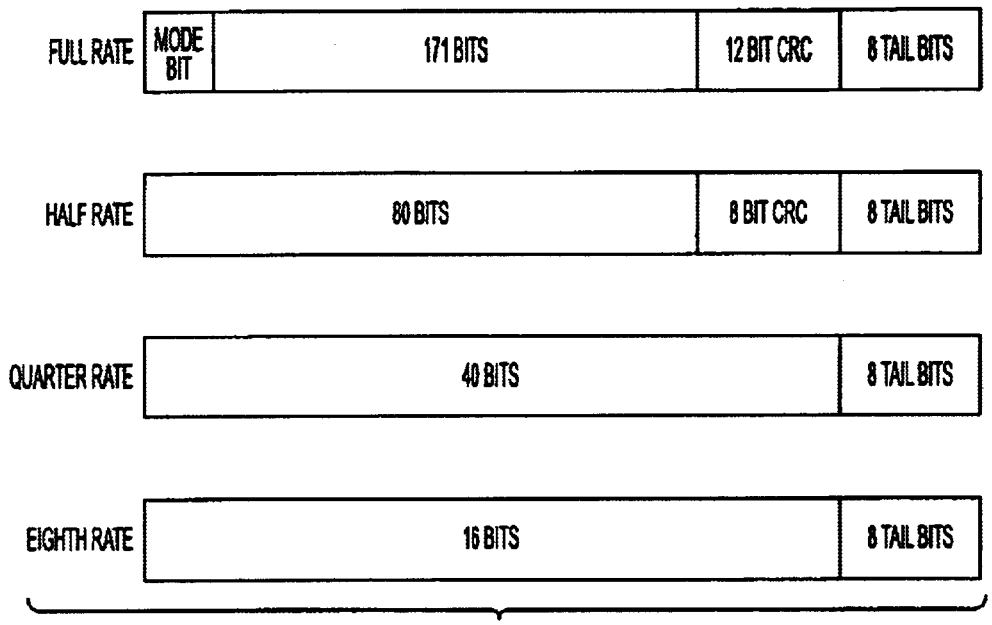
FIG. 11A illustrates the Rate Set 1 frame structure in an IS-95A compliant CDMA system.
Figure 11B:
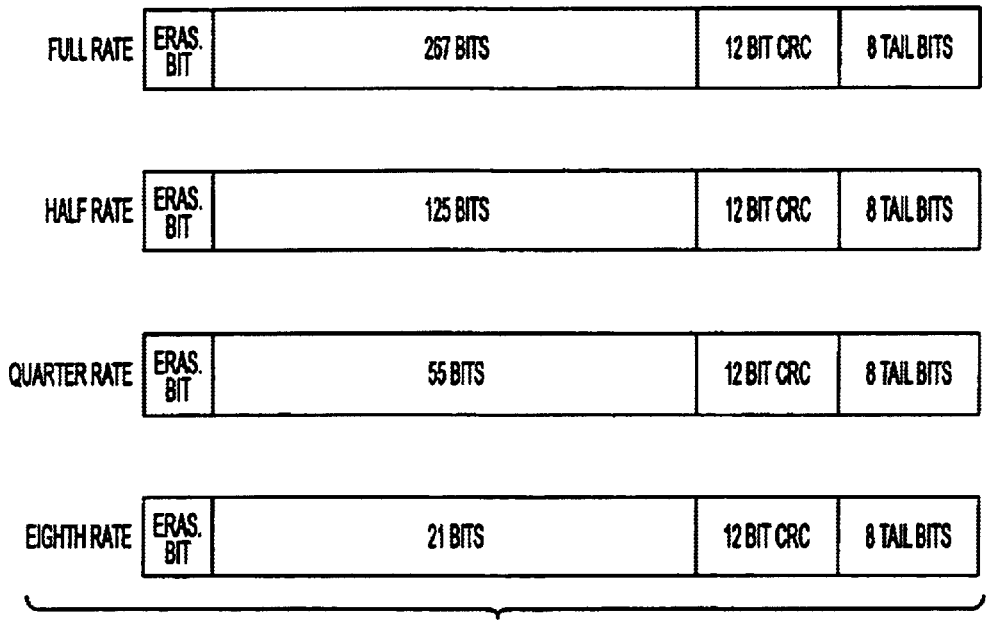
FIG. 11B illustrates the Rate Set 2 frame structure in an IS-95A compliant CDMA system.

A block diagram of a transmitter in a DSSS system is illustrated in FIG. 7. The operation of this transmitter has been previously explained in the background section, infra. In current commercial CDMA systems, a frame structure is employed in which bits from the digitizer 111 are grouped into frames, and then supplemented with. CRC check bits. The frame structure employed depends on the speed of the vocoder which is being employed, Rate Set 1 or Rate Set 2, and on the rate at which speech is being provided, Full Rate, Half Rate, Quarter Rate, and Eighth Rate. FIG. 11A illustrates the frame structure for the Rate Set 1 environment, and FIG. 11B illustrates the frame structure for the Rate Set 2 environment. The mode and erasure bits are beyond the scope of this discussion but are employed for purposes such as forward power control and the like. The tail bits are employed to flush the convolutional encoder which performs the FEC coding function in current commercial CDMA systems.

Figure 16A:
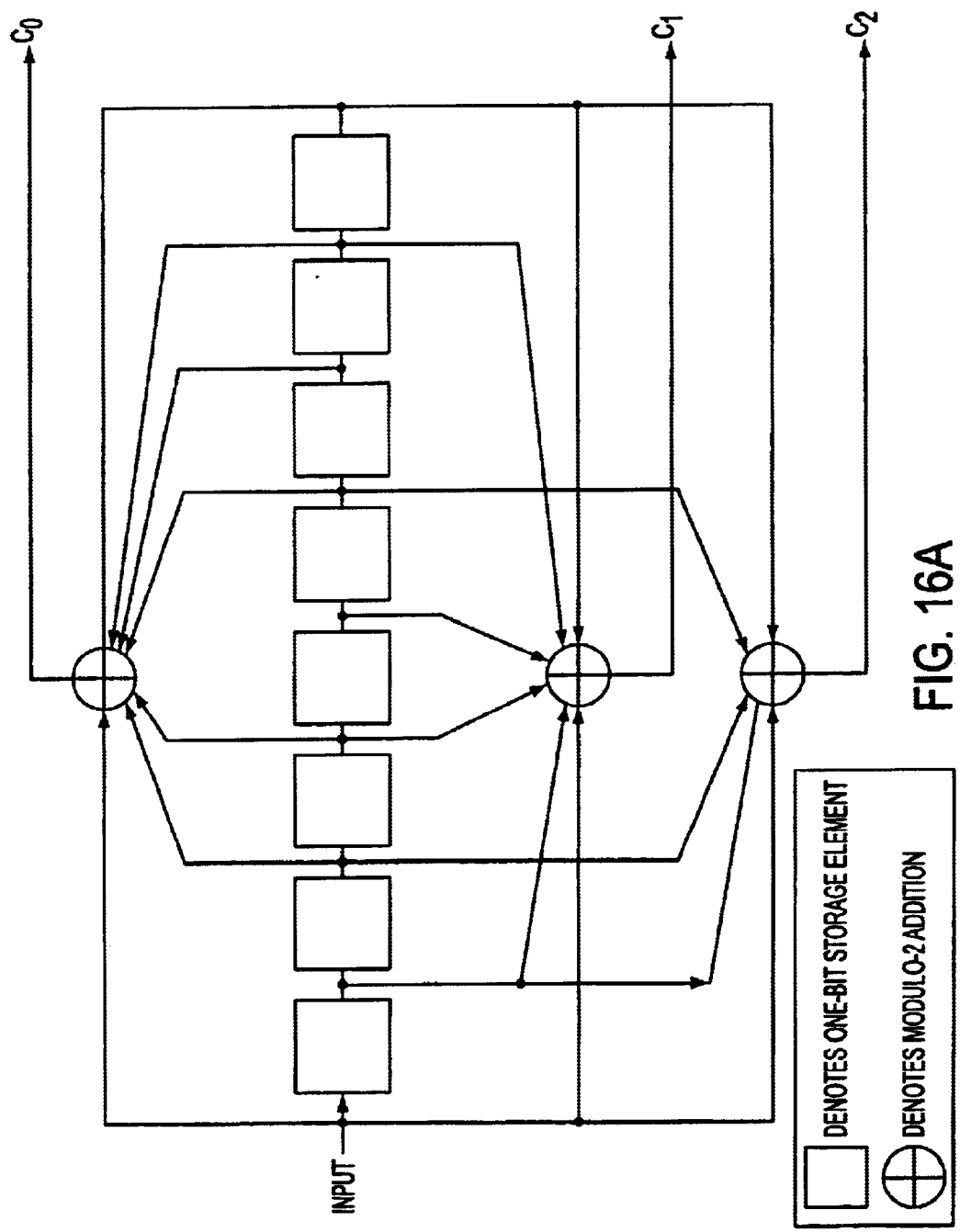
FIGS. 16A–16B are block diagrams of the convolutional coders employed respectively in the forward and reverse links of an IS-95A compliant CDMA system.
Figure 16B:
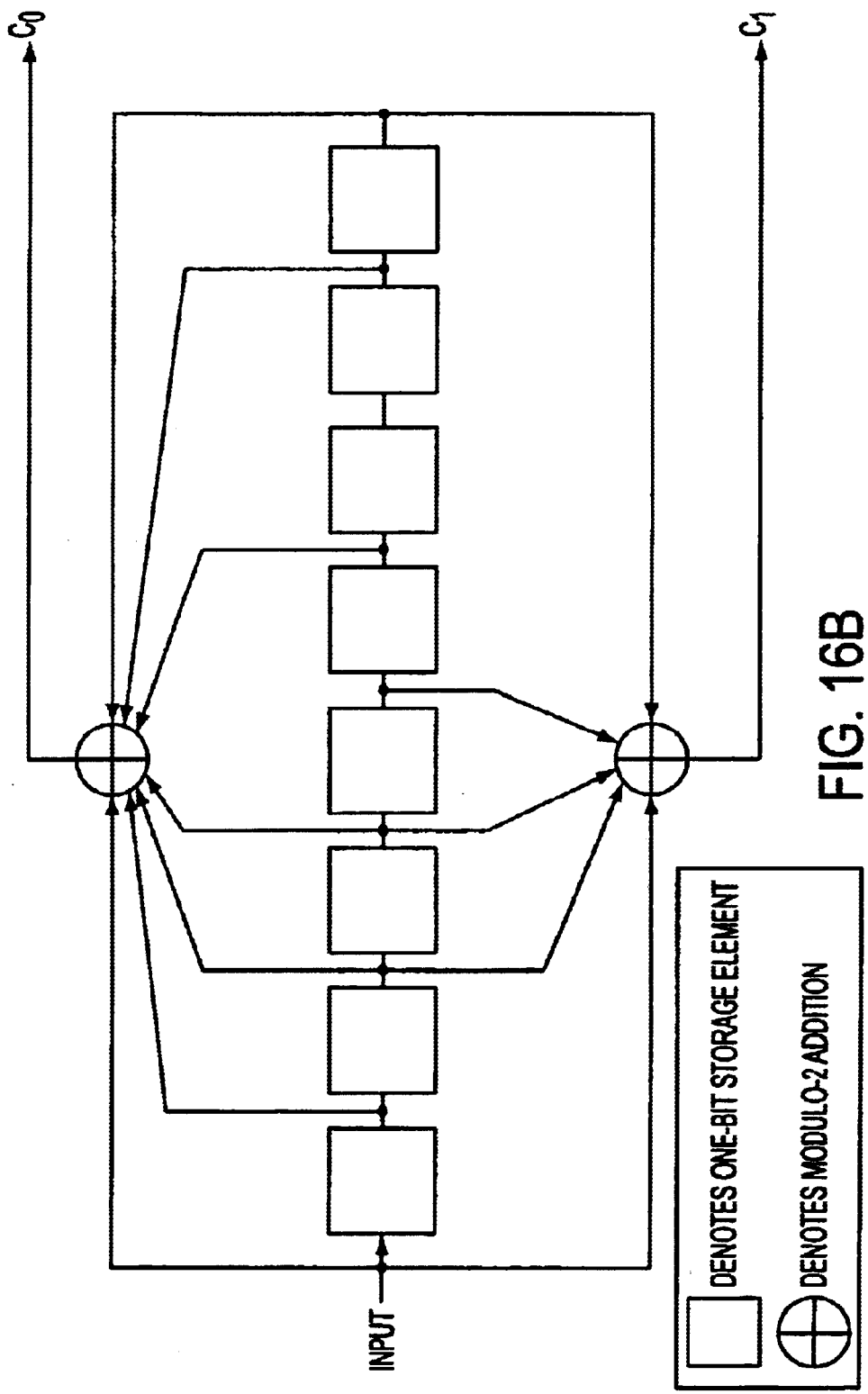

With reference to FIG. 7, in current commercial CDMA systems, the FEC coder 113 which is employed differs depending on whether the forward or reverse link is involved. In the forward link, a K=9, R=1/3 convolutional encoder, as illustrated in FIG. 16A, is employed, while in the reverse link, a K=9, R=1/2 convolutional encoder, as illustrated in FIG. 16B, is employed.

Figure 8:
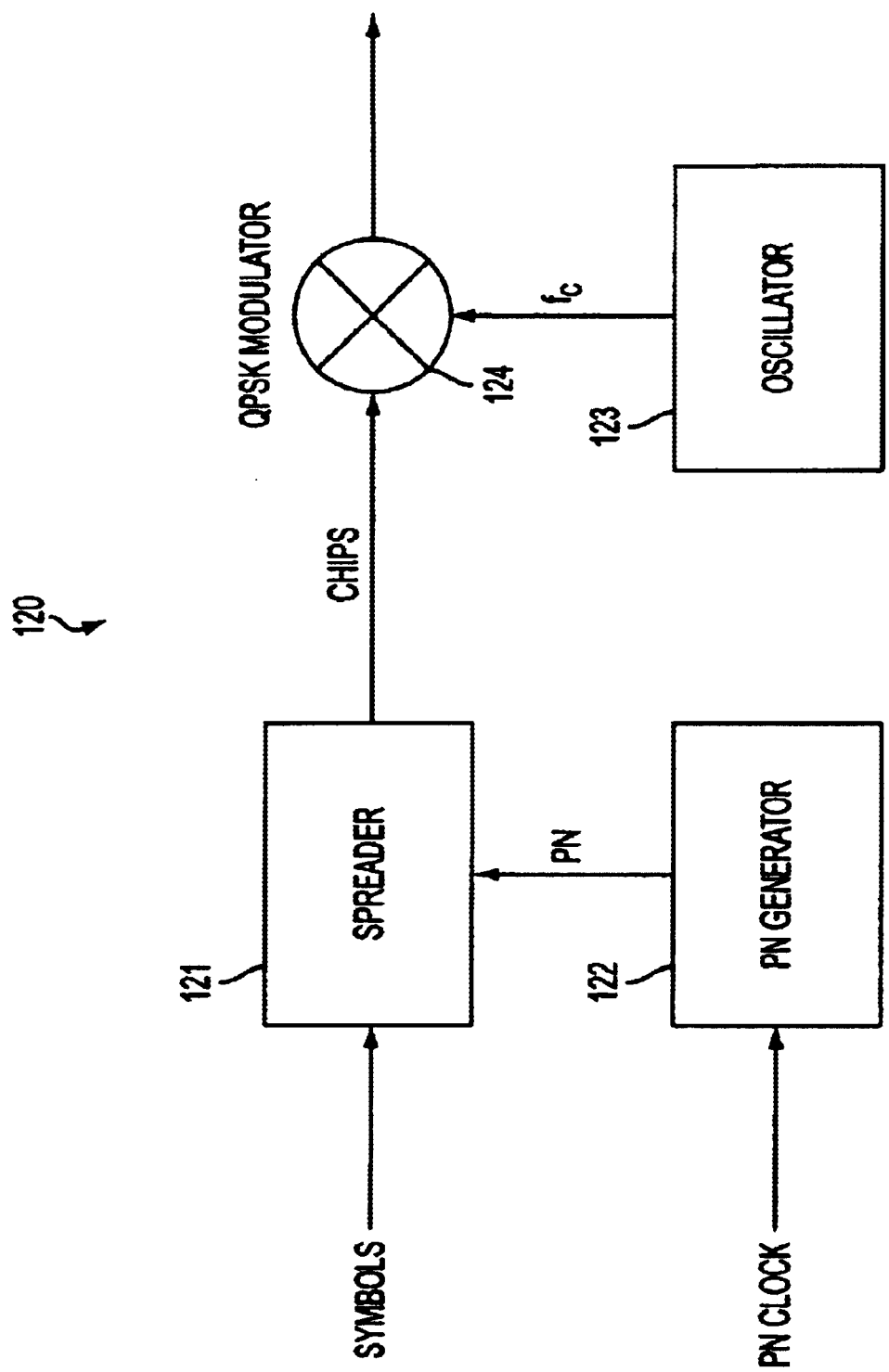
FIG. 8 is an example implementation of a transmitter in a DSSS or CDMA system.
Figure 9:
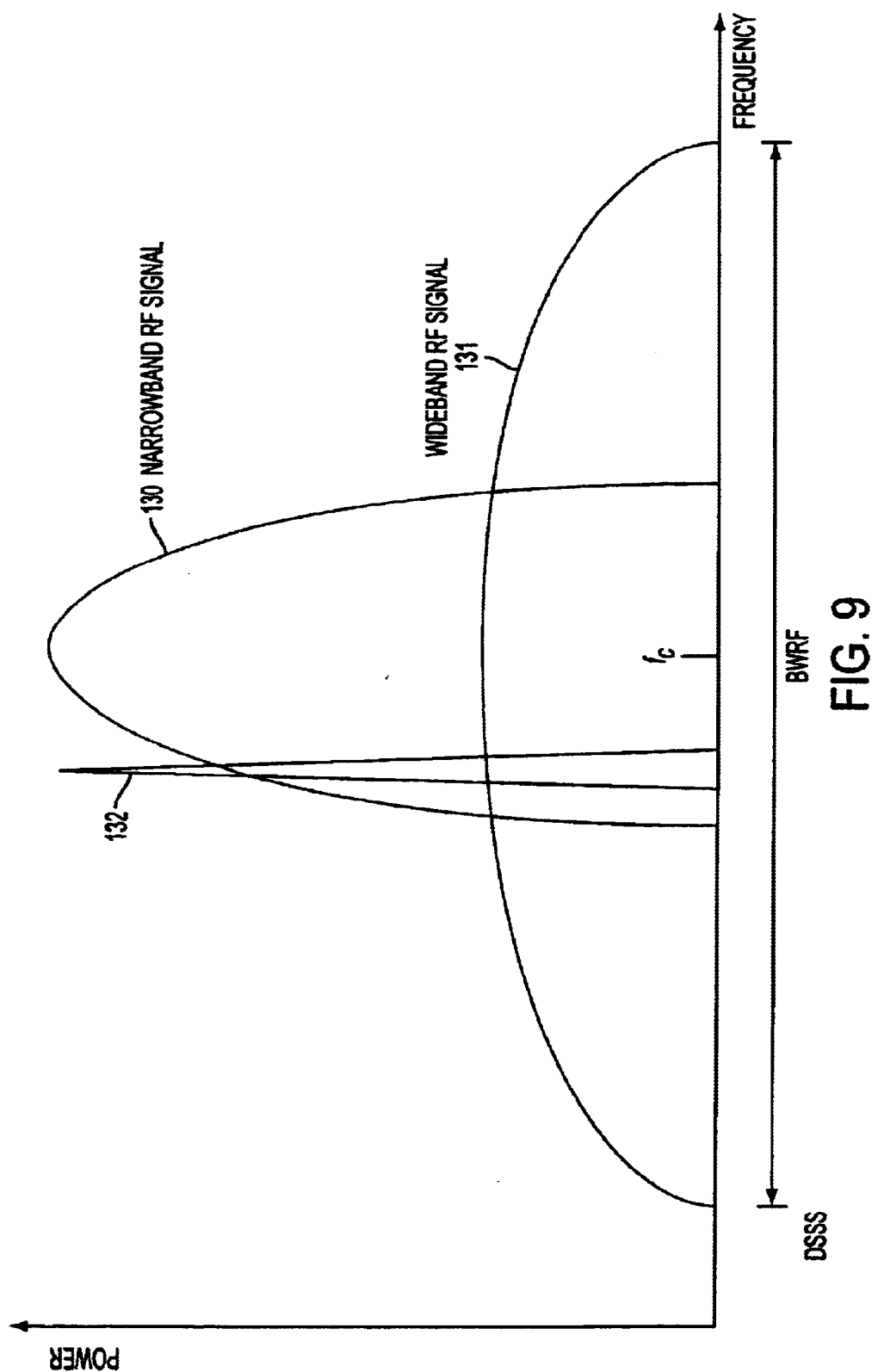
FIG. 9 illustrates the spreading action which occurs in a DSSS system.

A block diagram of one implementation of a transmitter 120 in the reverse link of a DSSS system is illustrated in FIG. 8. As illustrated, the symbols from the FEC coder (see FIG. 7) are input to spreader 121. A PN generator 122, responsive to a PN clock, generates a PN code unique to the user. The spreader 121 spreads the symbols using the PN code provided by PN generator 122. The chips of the spread signal are then modulated by QPSK modulator 124 onto a carrier signal having a frequency $f_c$ provided by local oscillator 123. The modulated signal is then transmitted over the physical channel. In actual implementations, additional components such as a bandpass filter and a power amplifier would be included, but these components have been omitted in FIG. 8 in order to simplify the explanation. A block diagram of a transmitter in the forward link in this implementation is similar except that spreading is accomplished with Walsh codes rather than PN codes.

Figure 12:
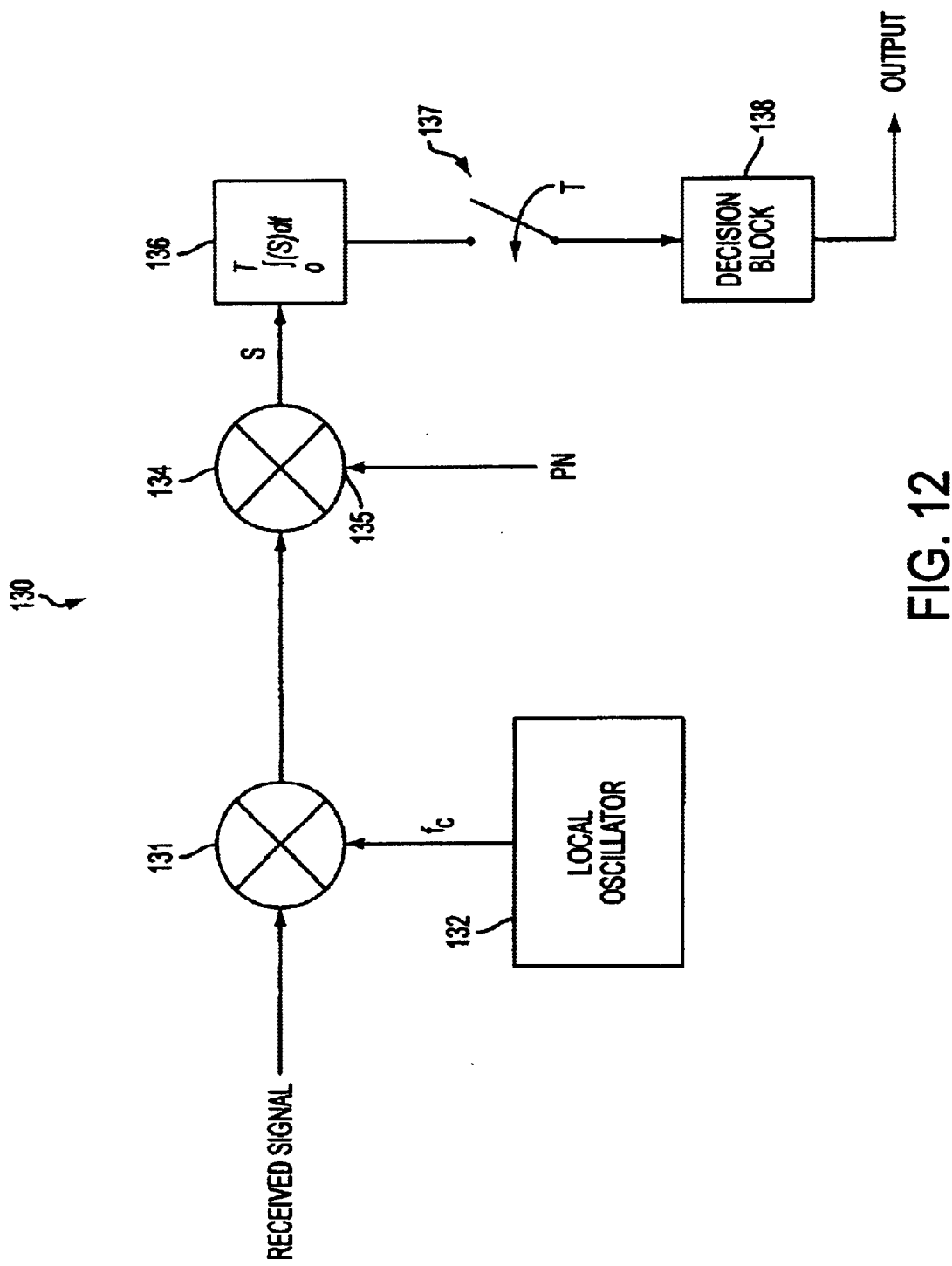
FIG. 12 is an example implementation of a receiver in a DSSS or CDMA system.

FIG. 12 is a block diagram of one implementation of a receiver 130 in the reverse link of a DSSS system. As illustrated, the received signal is input to demodulator 131 which demodulates the signal responsive to a signal provided by local oscillator 132 at the carrier frequency $f_c$. The demodulated signal is input to despreader 134 which despreads the demodulated signal responsive to the PN code for the user. In one implementation, depsreader 134 functions by XORing a digitized version of the demodulated signal with the repeated PN code. In another implementation, the despread signal is multiplied by the repeated PN code.

The output of the despreader is then input to integrator 136 which integrates the despread signal over successive bit times. Sampler 137 samples the integrated signal over successive bits times, and decision block 138 compares the sampled values with a threshold. In one implementation, the threshold is 0, a −1 in the analog domain translates into a logical "1" in the digital domain, and a +1 in the analog domain translates into a logical "0" in the analog domain. In this implementation, if the sampled value equals or exceeds the 0 threshold, a logical "0" is output, and if the sampled value is less than the 0 threshold, a logical "1" is output. In actual implementations, additional components such as a low pass filter and a low noise amplifier would be included, but these components have been omitted in FIG. 12 to simplify the discussion.

In the forward link, the receiver would be similar except that despreading would be accomplished using the Walsh code for the user rather than the PN code. Also, FIG. 12 illustrates what is known as a correlator receiver. It should be appreciated that embodiments are possible employing what is known as a matched filter receiver.

Figure 13A:
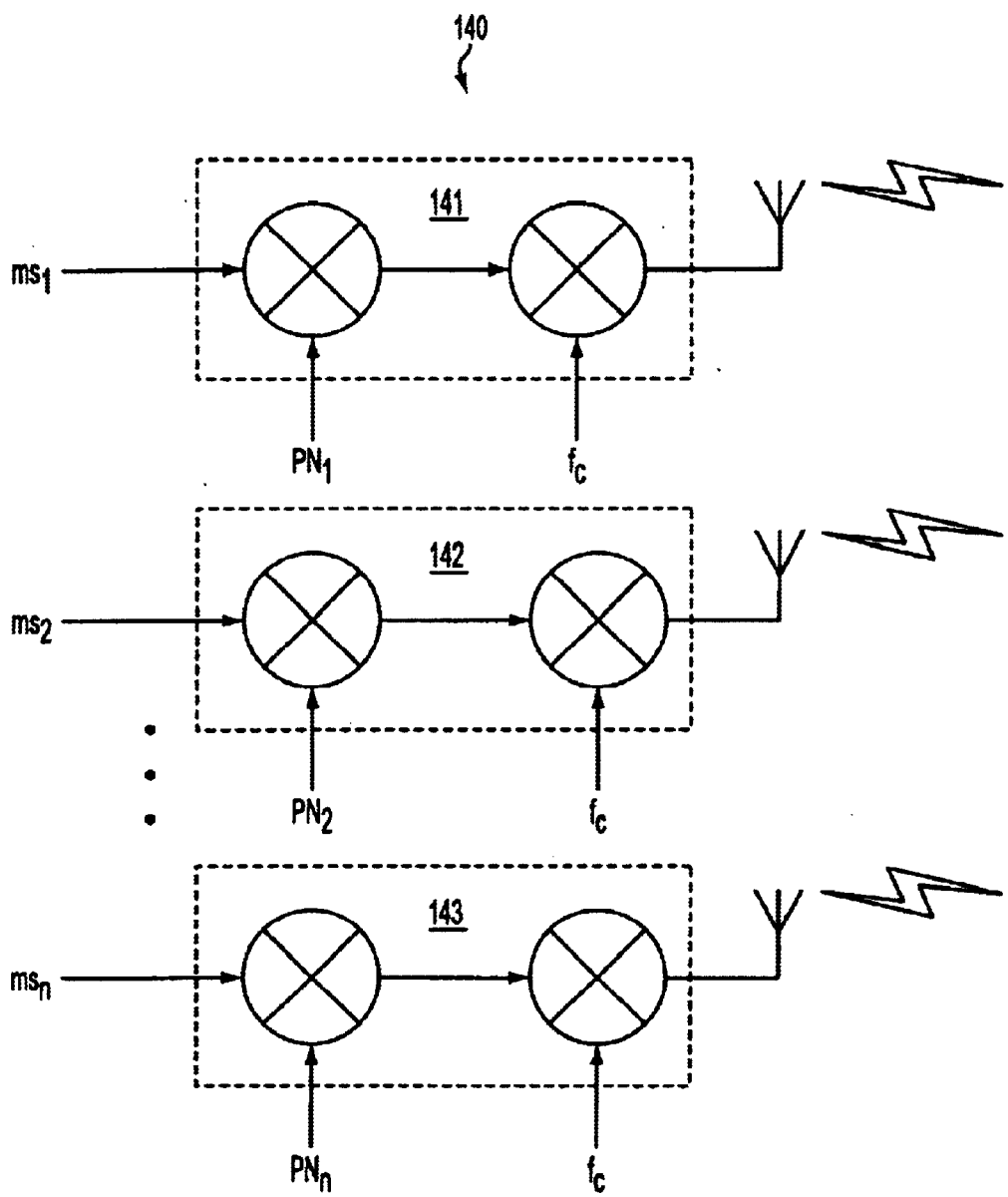
FIGS. 13A–13B illustrate the reverse link in an IS-95A compliant CDMA system.
Figure 13B:
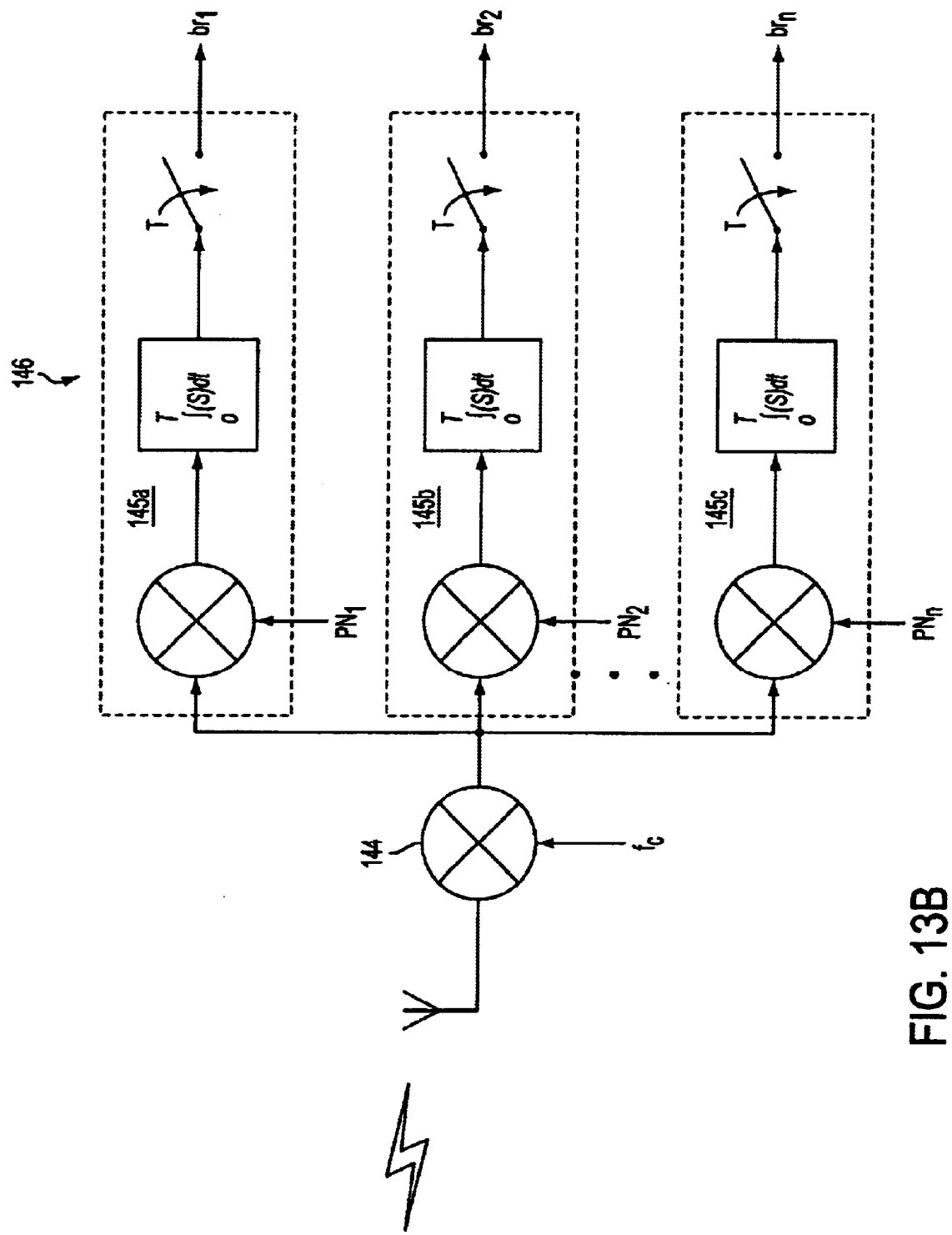

FIGS. 13A–13B illustrate in simplified form the operation of the reverse link in a multi-user environment. FIG. 13A illustrates a plurality n of transmitters 140 which are embodied in n different mobile units, where n is an integer greater than 1. Transmitter 141 corresponds to mobile 1; transmitter 142 corresponds to mobile 2; and transmitter 143 corresponds to mobile n.

The encoded symbols for user 1, identified as $ms_1$ in the figure, are spread using a PN sequence, $PN_1$, unique to user 1; the encoded symbols for user 2, identified as $ms_2$ in the figure, are spread using a PN sequence, $PN_2$, unique to user 2; and the encoded symbols for user n, identifed as $ms_n$ in the figure, are spread using a PN sequence, $PN_n$, unique to user n. The spread signal for each of the users is then modulated onto a carrier signal at the same frequency $f_c$, and transmitted to the base station handling the mobiles. The frequency $f_c$ is the mobile transmit frequency for a particular CDMA physical channel.

FIG. 13B illustrates a receiver 146 in the base station servicing the mobiles of FIG. 13A. Included are receiver portions 145a, 145b, 145c for each of the mobiles being handled by the base station. Portion 145a corresponds to user 1; portion 145b corresponds to user 2; and portion 145c corresponds to user n.

The transmitted signals for each of the mobiles are received and demodulated by demodulator 144. The demodulated information is then passed to each of the receiver portions 145a, 145b, and 145c. The information provided to portion 145a is despread using the PN sequence $PN_1$, and the despread information then integrated and sampled over successive symbol periods to result in the underlying symbols for user 1. The information provided to portion 145b is despread using the PN sequence $PN_2$, and the despread information then integrated and sampled over successive symbol periods to result in the underlying symbols for user 2. The information provided to portion 145c is despread using the PN sequence $PN_n$, and the despread information then integrated and sampled over successive symbol periods to derive the underlying symbols for user n. The PN codes, having little or no correlation with each other, define logical channels for each of the users.

Figure 14A:
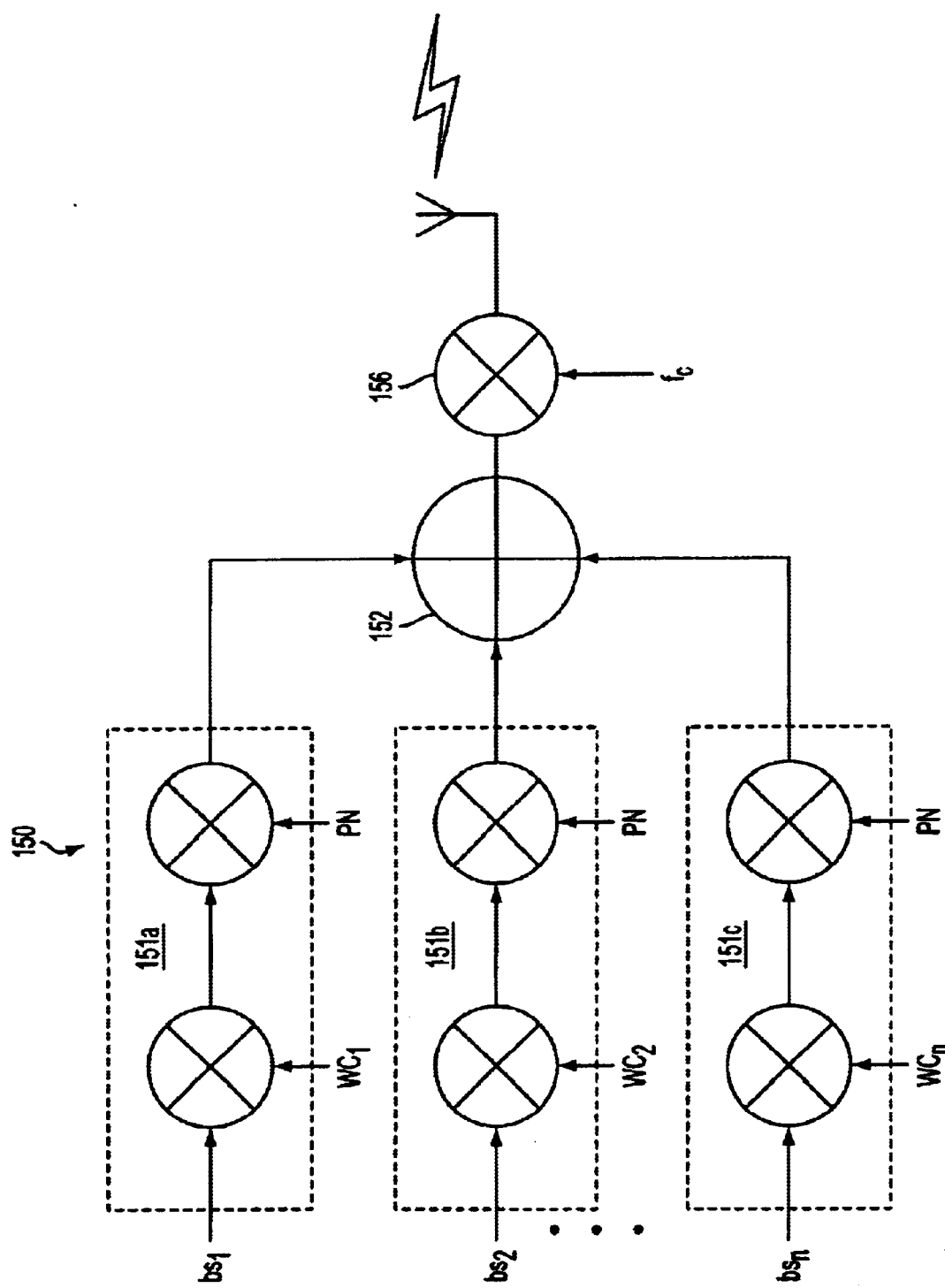
FIGS. 14A–14B illustrate the forward link in an IS-95A compliant CDMA system.
Figure 14B:
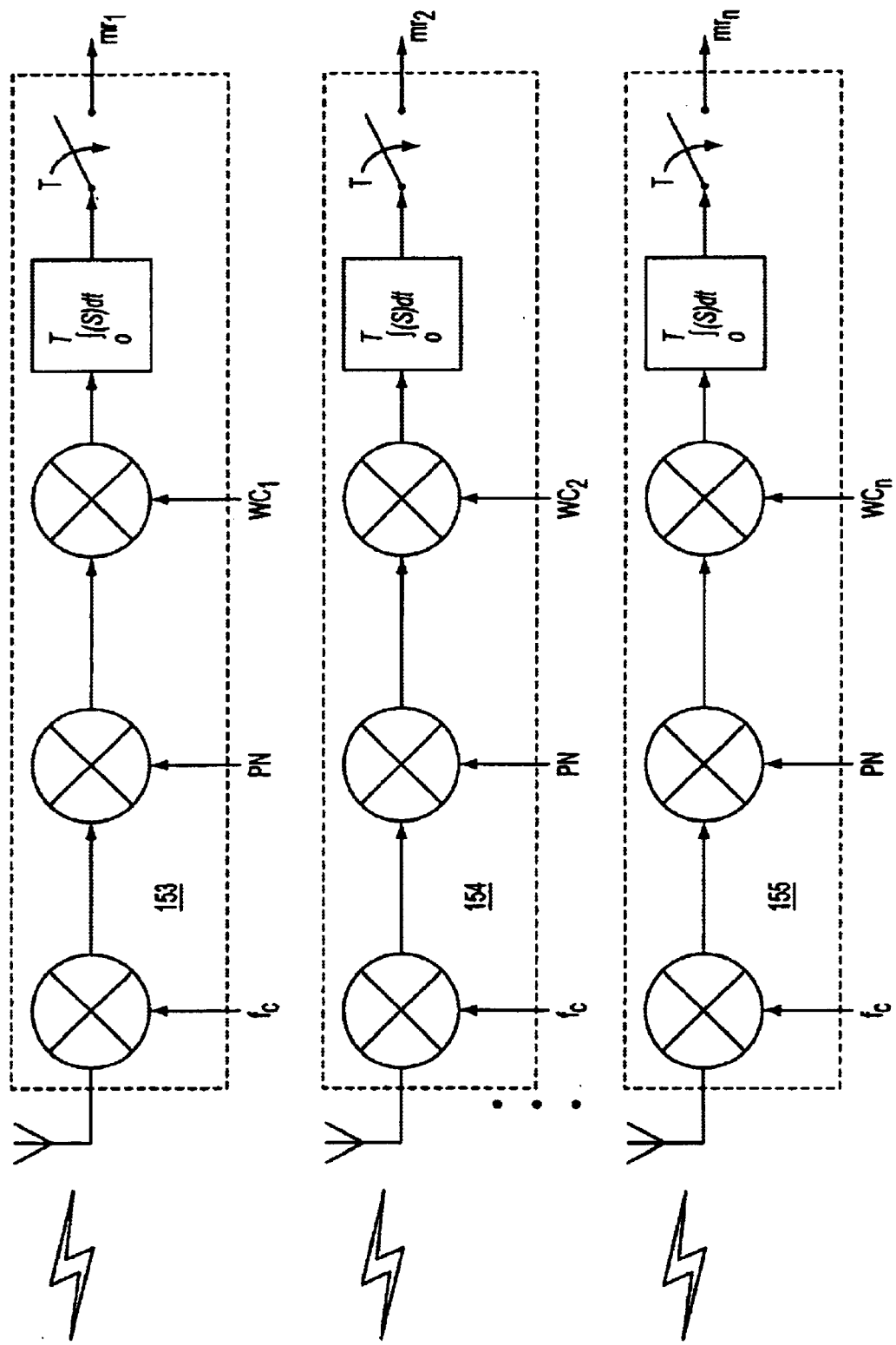
Figure 15:
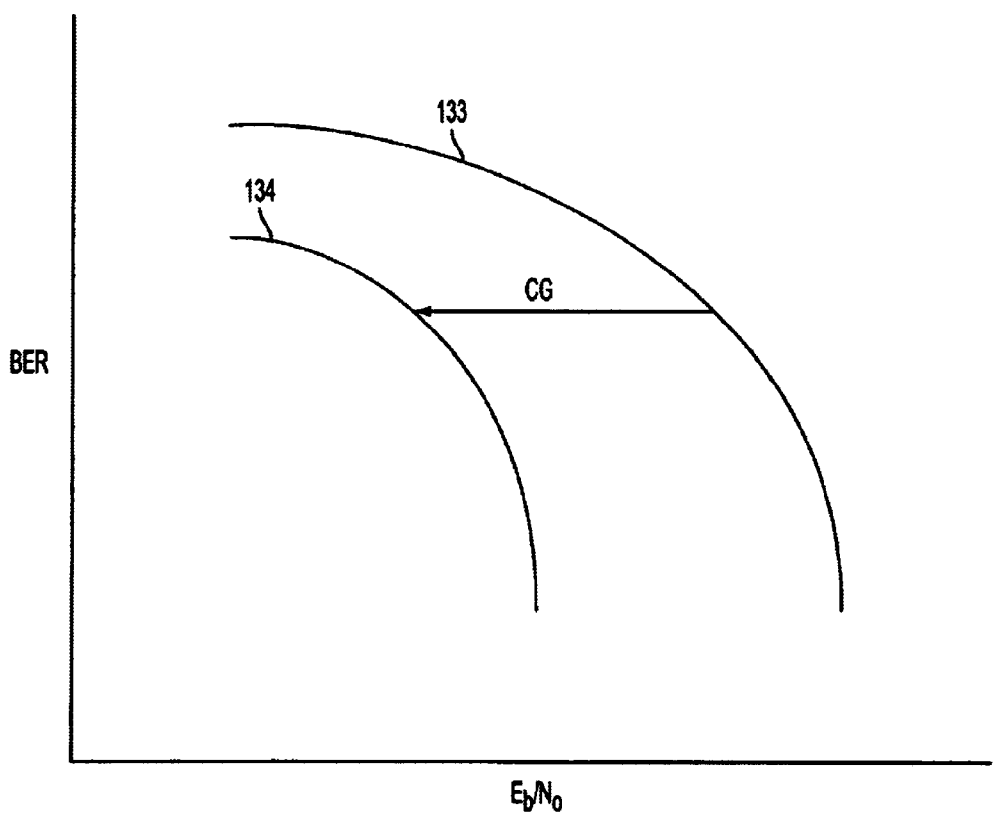
FIG. 15 illustrates the concept of coding gain.

FIGS. 14A–14B illustrate in simplified form operation of the forward link in a multi-user environment. FIG. 14A illustrates the transmitter 150 in the base station. The transmitter 150 comprises portions 151a, 151b, 151c for each of the mobiles being serviced by the base station. Portion 151a receives the encoded symbols for user 1, $bs_1$, and spreads then using a Walsh code, $WC_1$, as the spreading sequence. The code $WC_1$ is unique to user 1. The spread signal is then XORed with a pseudo-random noise code, PN, which is unique to the base station, and which allows the mobiles to distinguish the transmissions from this base station from those of other base stations.

Portions 151b receives the encoded symbols for user 2, $bs_2$, and spreads them using Walsh code $WC_2$ as the spreading sequence. The spread signal is then XORed with the pseudo random noise code PN which is unique to the base station.

Finally, portion 151c receives the encoded symbols for user n, $bs_n$, and spreads them using Walsh code $WC_n$ as the spreading sequence. The spread signal is then again XORed with the pseudo-random noise code PN which is unique to the base station.

The XORed signals are then added together by adder 152 to produce a transmit signal which is modulated by modulator 156 onto a carrier signal at the frequency $f_c$, which is the base station transmit frequency for the desired CDMA physical channel. The modulated signal is then transmitted.

FIG. 14B illustrates the receivers 153, 154, 155 in the respective mobile units. Receiver 153 corresponds to mobile 1; receiver 154 corresponds to mobile 2; and receiver 155 corresponds to mobile n.

Within receiver 153, the transmitted signal from the base station is received, possibly disturbed by transmissions from other base stations. The received signal is then XORed with the PN sequence for the base station to recover the transmission from the base station. The recovered signal is then despread by XORing it by the Walsh code for user 1, $WC_1$. The despread signal is then integrated and sampled over successive symbol periods to recover the underlying symbols for user 1. Within receiver 154, the received signal is demodulated, and then XORed with the PN code for the base station to recover the transmission from the base station. This signal is then despread by Walsh code $WC_2$, and the despread information then integrated and sampled over successive symbol periods to recover the underlying symbols for user 2.

Within receiver 155, the received signal is demodulated, and then XORed with the PN code for the base station to recover the transmission from the base station. This signal is then despread by Walsh code $WC_n$, and the despread information then integrated and sampled over successive symbol periods to recover the underlying symbols for user n. The Walsh codes, being orthogonal with respect to one another, define different logical channels for each of the users.

2. Other Example Environments

Other example environments in which the subject invention may be beneficially employed is within DSSS wireless local loop (WLL) systems and cordless telephone systems.

Figure 2:
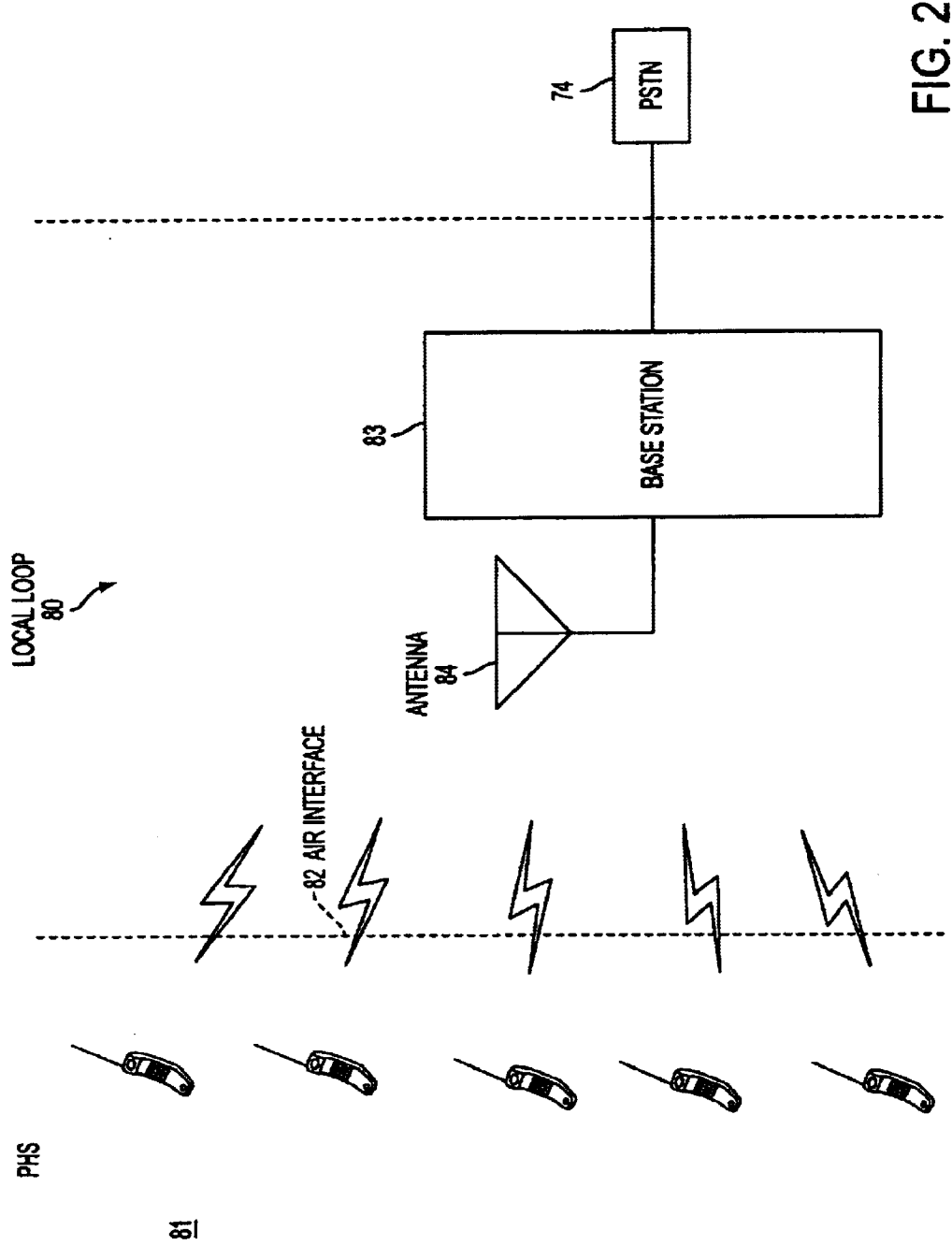
FIG. 2 illustrates one example implementation of a wireless local/loop (WLL) network.

FIG. 2 illustrates the architecture of one implementation 80 of a DSSS wireless local loop (WLL). It consists of a cluster of Portable Handsets (PHS) 81, and a base station 83 equipped with an antenna 84. The base station could be at the center of an office building for example. The base station then interfaces with the handsets via an air interface 82. Logical channels between each of the handsets 81 and the base station 83 are defined by orthogonal or pseudo-random spreading sequences unique to each of the users.

Figure 3:
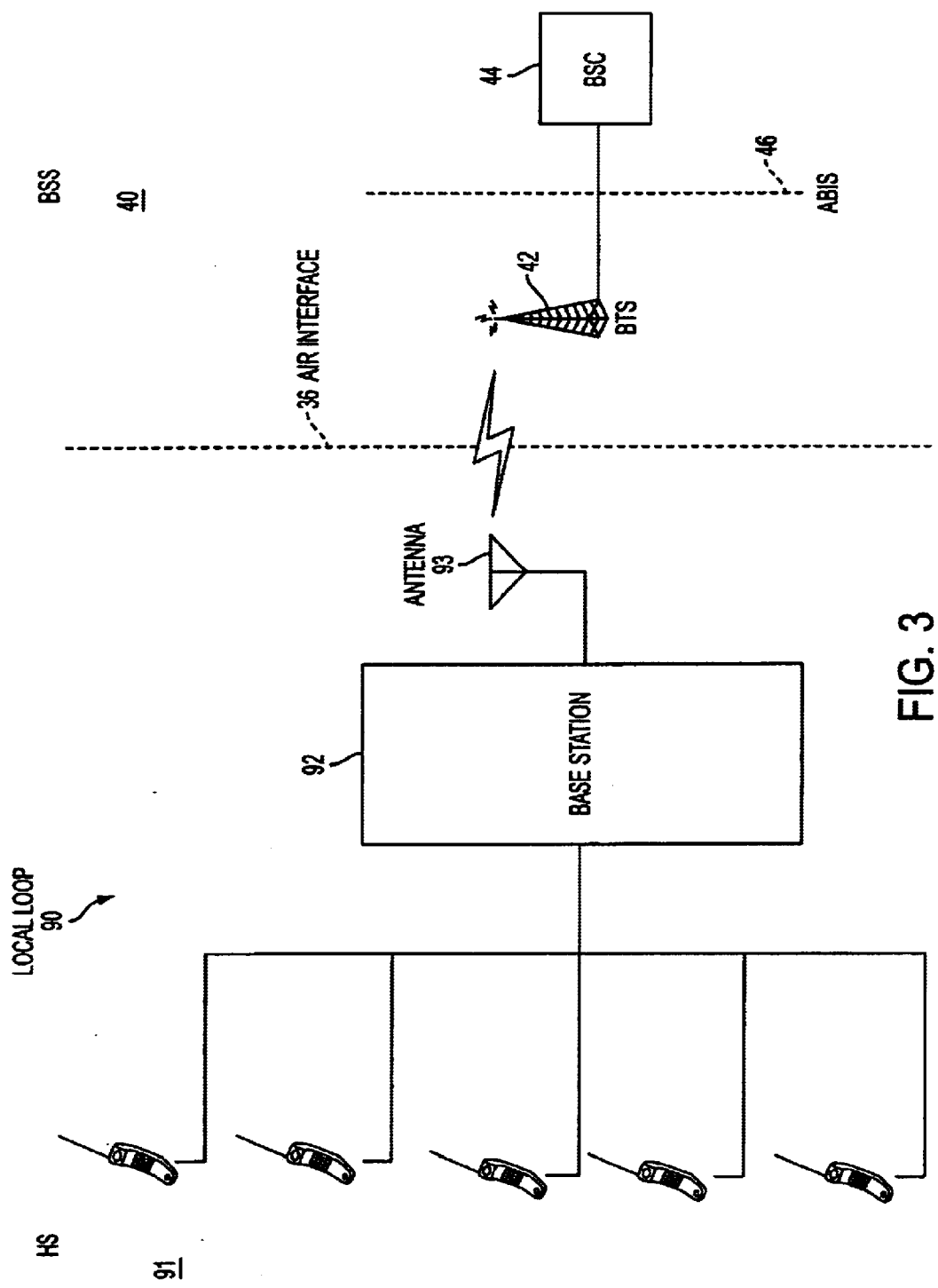
FIG. 3 illustrates a second example implementation of a WLL network.

FIG. 3 illustrates an alternative implementation 90 of a DSSS WLL. This implementation could be utilized in areas where cellular coverage is good. It consists of handsets (HS) 91 and a base station 92. The handsets 91 are wired to the base station 92, and the base station 92 interfaces via an antenna 93 over an air interface 36 to a cellular network 40. In this implementation, the cellular network could be the same as illustrated in FIG. 1, with the base station 92 taking the place of the mobile handsets in that example. This implementation still requires the installation of costly wiring in the local loop. But it may be suitable for remote areas or areas where access to the network is difficult.

Figure 4:
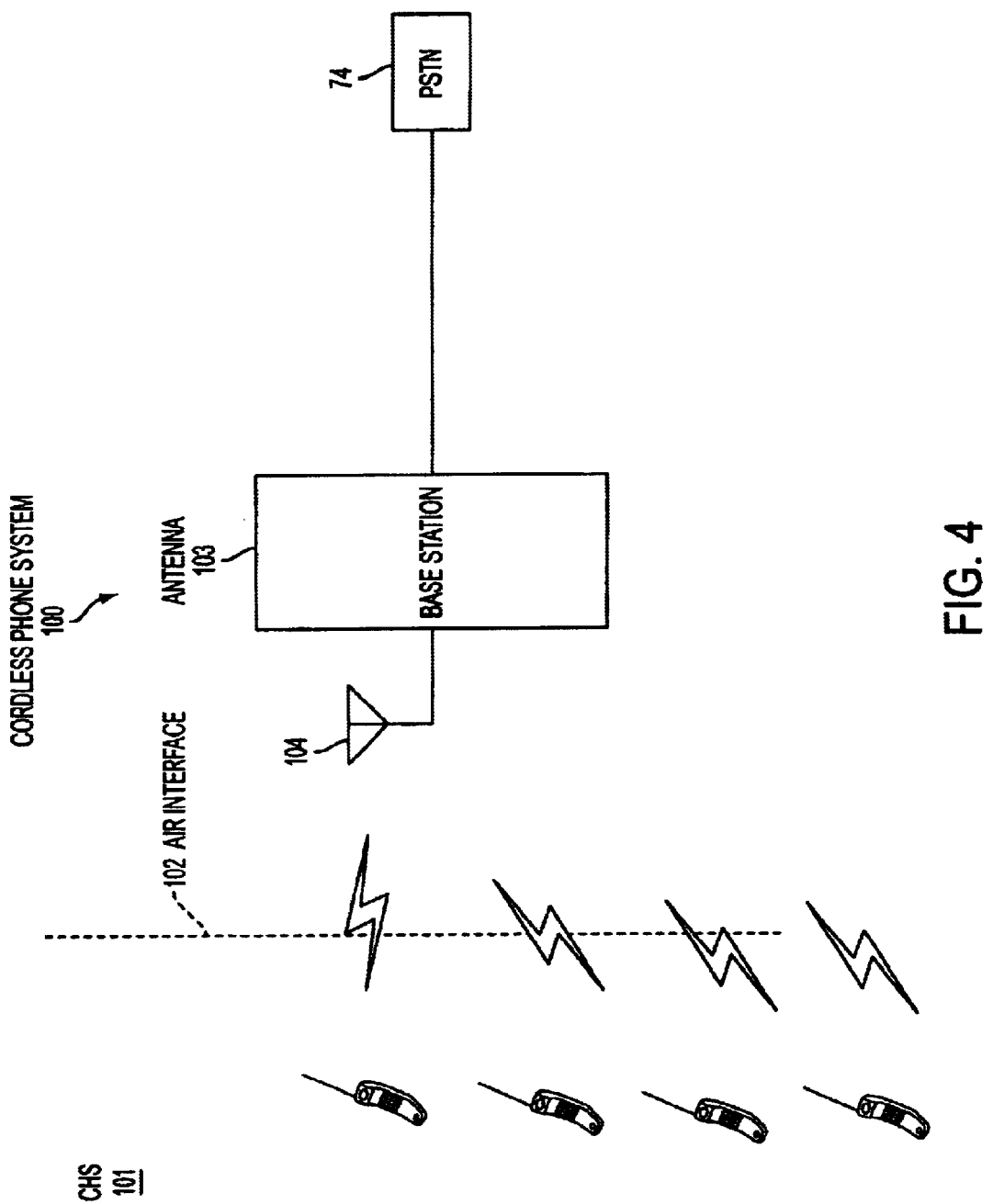
FIG. 4 illustrates an example implementation of a cordless phone network.

Another area in which wireless technology is aiding telecommunications is in the home where the traditional telephone handset is being replaced by the cordless phone system. A DSSS cordless phone system implementation 100 is illustrated in FIG. 4. It comprises a cordless telephone system base station 103 and a plurality of cordless handsets 101. The base station 103 communicates with the handsets 101 over an air interface 102 via an antenna 104. In addition, the base station 103 is connected through a wired connection to the PSTN 74. Cordless handsets in the home allow for untethered use of the handset enabling the user the freedom to move about as long as they stay in range of the base station.

3. Summary of Current DSSS Channel and Frame Structures

Figure 17A:
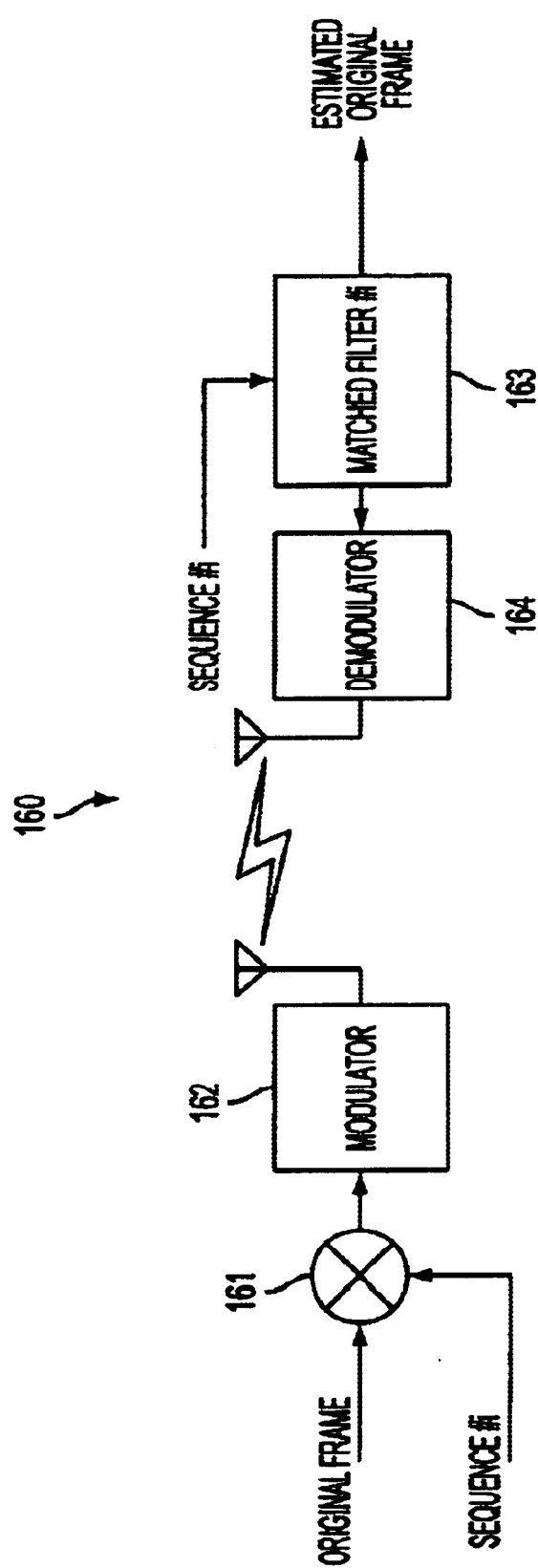
FIG. 17A illustrates a conventional DSSS system.

From the foregoing, it can be seen that a channel for communicating information from a source to a destination over a wireless interface in a DSSS system can be modeled as shown in FIG. 17A. As shown, at the source, whether it be a mobile or a base station, a transmitter is provided in which an original frame of encoded symbols is XORed by spreader 161 with a spreading sequence, Sequence #i, which is unique to the channel. The frame comprises encoded symbols produced by a FEC coder.

Within the transmitter, the spread frame is then modulated by modulator 162 onto a signal at an RF carrier frequency, and the signal is transmitted over the wireless interface. A receiver at the destination, whether it be a mobile or base station, then receives the signal, and demodulator 164 within the receiver demodulates the signal.

The spread frame is then despread by matched filter #i, identified by numeral 163, using the spreading sequence, Sequence #i, as an input.

Figure 17B:
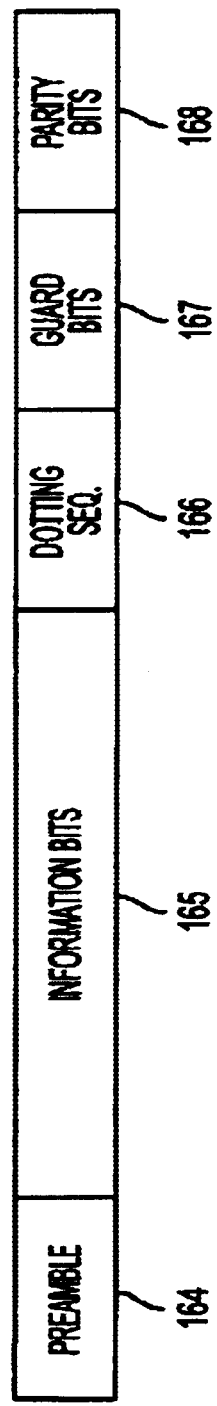
FIG. 17B illustrates the frame structure in the DSSS system of FIG. 17A.

A typical encoded frame structure which applies in the case of a systematic block code, i.e., a code in which k information bits produce n parity bits, and the k original bits and the n parity bits are both provided as outputs, is illustrated in FIG. 17B. As can be seen, the frame includes a preamble 164, followed by the k original information bits 165. Then there is the dotting sequence 166, guard bits 167, and the n parity bits 168.

In the case in which the DSSS system is an IS-95A compliant system, the spreading sequence used depends on whether a forward link (base to mobile) or reverse (mobile to base) is involved. As illustrated in FIG. 14, in the case of the forward link, the spreading sequence is a Walsh code, and, as illustrated in FIG. 13, in the case of a reverse link, the spreading sequence is a PN code.

Moreover, in the case of an IS-95A compliant system, the FEC coder is a convolutional encoder, the parameters of which depend on whether the forward or reverse link is involved, and upon whether a Rate Set 1 or Rate Set 2 vocoder is being used. In the case of a forward link, for a Rate Set 1 vocoder, a R=1/2, K=9 convolutional encoder is used, as illustrated in FIG. 16B, while, for a Rate Set 2 vocoder, a R=3/4, K=9 convolutional encoder is used. In the case of the reverse link, for a Rate Set 1 vocoder, a R=1/3, K=9 convolutional encoder is used, as illustrated in FIG. 16A, while, for a Rate Set 2 vocoder, a R=1/2, K=9 convolutional encoder is used, as illustrated in FIG. 16B.

The frame structure for an IS-95A compliant system is illustrated in FIGS. 11A–11B, with FIG. 11A illustrating the frame structure for a Rate Set 1 vocoder, and FIG. 11B illustrating the frame structure for a rate Set 2 vocoder. As can be seen, there is no component of parity bits in the frame. Instead, all the information bits are encoded into symbols, with the number of bits per symbol depending on the rate of the code. For a R=1/2 code, for example, there are 2 bits per symbol, and thus, 2 encoded bits per original bit. For a R=1/3 code, there are 3 bits per symbol, and thus 3 encoded bits per original bits. The encoded bits are what is contained in the frames of FIGS. 11A and 11B.

4. Preferred Embodiments

Figure 18A:
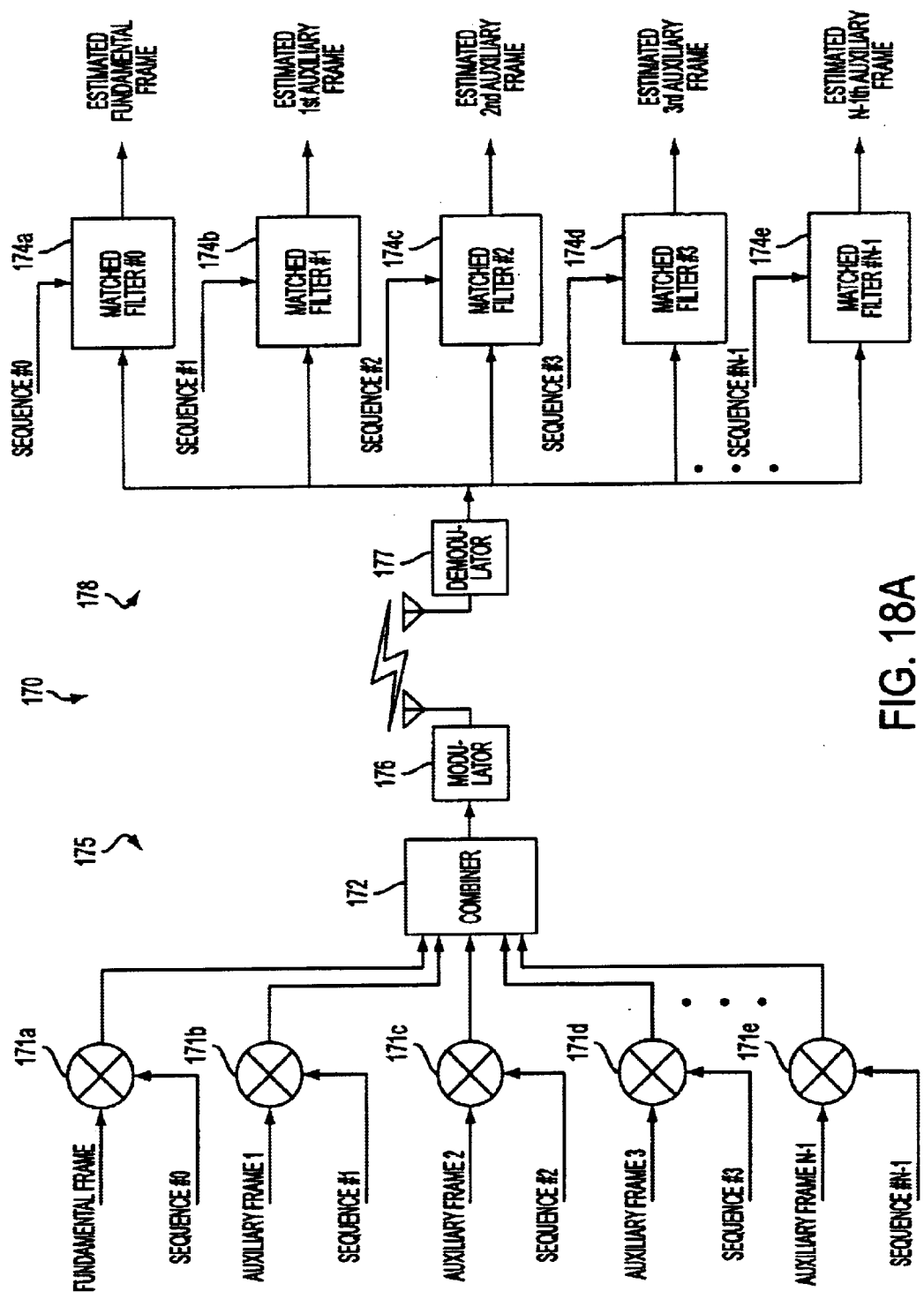
FIG. 18A illustrates a DSSS system in accordance with a first embodiment of the subject invention.

A first embodiment of the subject invention is illustrated in FIG. 18A, which shows a DSSS system 170 for transmitting information between a transmitter 175 and a receiver 178 over a wireless interface. A block of information bits or symbols is received in the transmitter, and derived therefrom is a fundamental block containing the original information bits, and one or more auxiliary blocks typically containing encoded or parity bits. Compared to the frame structure illustrated in FIG. 17B, in the embodiment of FIG. 18A, the information bits are separated from the parity bits, with separate blocks being defined for each. In one implementation, each of the blocks is a frame. The frame containing the information bits is referred to as the fundamental frame, and the frame containing the parity bits is referred to as an auxiliary frame.

FEC codes having different levels of coding gain may be employed to define additional auxiliary frames. The FEC codes may be systematic or they may be non-systematic. If the former, then only the parity bits are included in the auxiliary frame to avoid unnecessary redundancy with the contents of the fundamental frame. A number of FEC codes are possible for the purpose of forming an auxiliary frame, including convolutional codes, block codes, Hamming codes, CRC codes, orthogonal codes such as Reed-Mueller codes, turbo codes, Golay codes, Reed-Solomon codes, BCH codes, etc.

In the embodiment of FIG. 18A, within the transmitter 175, a number N−1 of auxiliary frames are formed, wherein N is an integer greater than or equal to 2. In addition, a fundamental frame is formed which contains the original unencoded information bits. The FEC codes used to form the auxiliary frames are of the type discussed previously.

Within the transmitter, each of the frames is then assigned and spread with a spreading sequence unique to the frame. In one implementation, the spreading sequences are complementary sequences with auto-correlation and cross-correlation properties which are such that the composite sequence can be despread at the receiver without substantial error. In one implementation example, the length of the complementary sequences is 10 or more.

Thus, in FIG. 18A, the fundamental frame is spread by spreader 171a using Spreading Sequence #0; auxiliary frame #1 is spread by spreader 171b using Spreading, Sequence #1; auxiliary frame #2. is spread by spreader 171c using Spreading Sequence #2; auxiliary frame #3 is spread by spreader 171d using Spreading Sequence #3; and auxiliary frame #N−1 is spread by spreader 171e using Spreading Sequence #N−1.

The spread frames are then combined, prior to transmission, by combiner 172. In one implementation, combiner 172 combines the frames by xoring of the bits togetherto form a composite signal.

A signal representative of the combined frames is then modulated by modulator 176 onto a signal at a desired carrier frequency. The signal is then transmitted over the wireless interface.

At the destination, the receiver 178 is provided which includes demodulator 177 for demodulating the received signal. Also included is a plurality N of matched filters 174a, 174b, 174c, 174d, 174e. The filters are arrayed as shown, and each corresponds to one of the frames in the combined transmission signal. Equivalently, a plurality of correlators of the type described in relation to FIG. 12 could be employed. The demodulated signal is input to each of the matched filters.

Each of the filters then estimates, subject to any noise introduced by transmission over the wireless interface, the frame it corresponds to using the spreading sequence that was used to spread the frame. Thus, in FIG. 18A, matched filter 174a estimates the fundamental frame using Spreading Sequence #0, the sequence that was used to spread the fundamental frame at the transmitter; matched filter 174b estimates auxiliary frame #1 using Spreading Sequence #1; matched filter 174c estimates auxiliary frame #2; matched filter 174d estimates auxiliary frame #3; and matched filter 174e estimates auxiliary frame N−1.

Error detection bits, such as CRC bits, may be appended to each frame to detect and possibly correct frame errors. One or more of the estimated auxiliary frames are then used for the purpose of estimating the fundamental frame, including correcting bit errors in the fundamental frame using suitable FEC decoders corresponding to the FEC coders used to form the frames at the transmitter. Responsive to the quality of the physical channel, as measured by indicators or metrics such as the frame error rate (FER) or bit error rate (BER), selected ones or all of the estimated auxiliary frames may be used to estimate the fundamental frame.

Figure 18B:
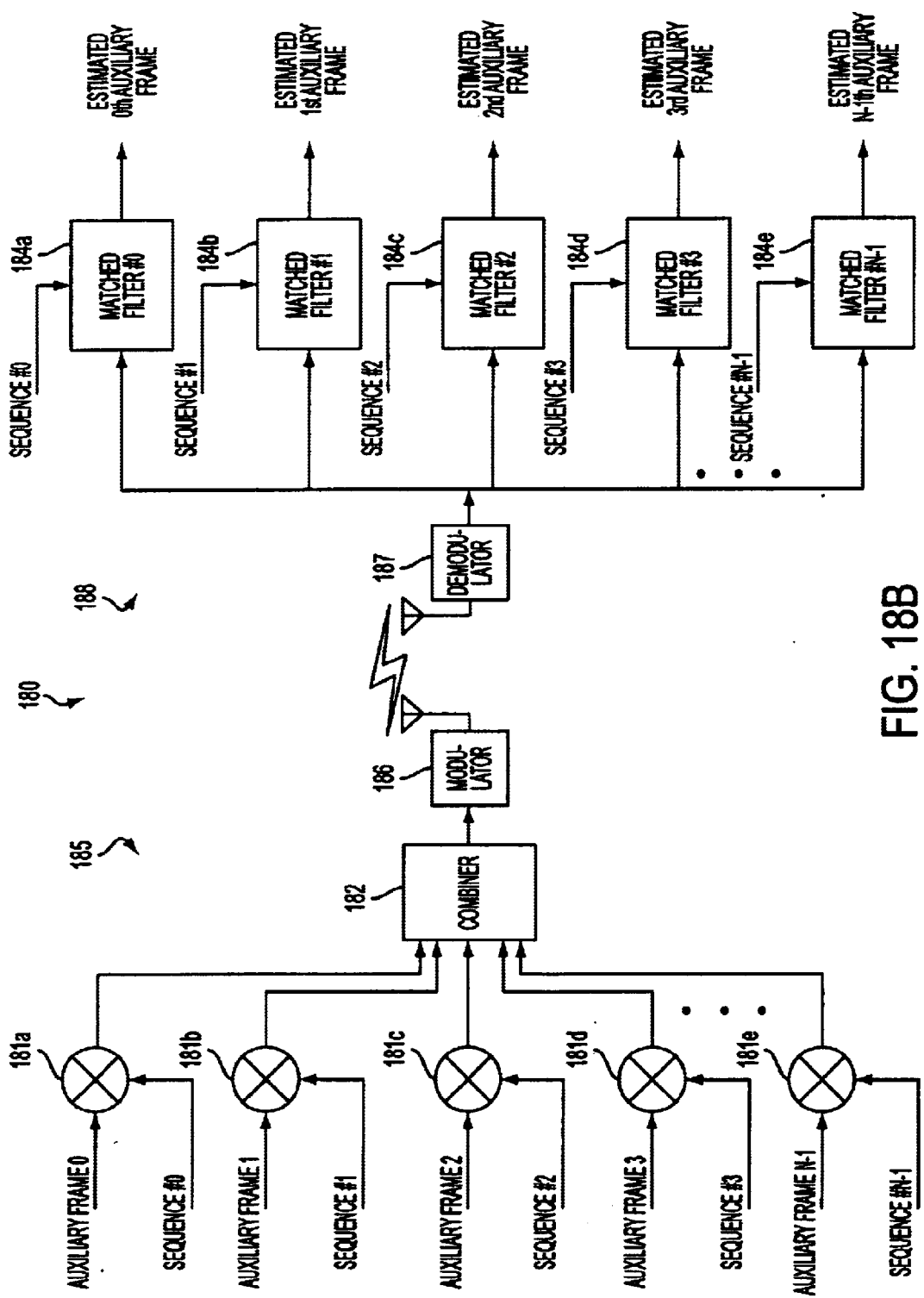
FIG. 18B illustrates a DSSS system in accordance with a second embodiment of the subject invention.

A second embodiment 190 of the subject invention is illustrated in FIG. 18B. In this embodiment, unlike the previous embodiment, only auxiliary frames comprising encoded or parity bits or symbols from various FEC coders are used to form the transmitted signal, and the fundamental frame, comprising the original information bits, is avoided. There, the output of the encoder comprises encoded bits or symbols exclusive of the original information bits.

In this embodiment, in the transmitter 195, FEC coders are employed to form a total of N auxiliary frames, wherein N is an integer greater than 1. Thus, in FIG. 18B, a first FEC coder is used to form auxiliary frame #0; a second FEC coder is used to form auxiliary frame #1; a third FEC coder is used to form auxiliary frame #2; a fourth FEC coder is used to form auxiliary frame #3; and a (N–1)th FEC coder is used to form auxiliary frame # (N–1).

Within the transmitter 195, each of the auxiliary frames is then spread using a spreading sequence unique to the frame. Thus, in FIG. 18B, auxiliary frame #0 is spread by spreader 181a using Spreading Sequence #0; auxiliary frame #1 is spread by spreader 181b using Spreading Sequence #1; auxiliary frame #2 is spread by spreader 181c using Spreading Sequence #2; auxiliary frame #3 is spread by spreader 181d using Spreading Sequence #3; and auxiliary frame #N–1 is spread by spreader 181e using Spreading Sequence #N–1.

Then, the spread frames are combined by combiner 182. In one implementation, the spread frames are combined by xoring them together.

Within the transmitter 185, a signal representing the combined frames is modulated by modulator 186 onto a signal at a desired carrier frequency, and transmitted over the physical, wireless channel. At the destination, within receiver 188, the signal is received and demodulated by demodulator 187.

Within the receiver 188, a plurality of matched filters 184a, 184b, 184c, 184d, 184e are arrayed. Equivalently, correlators could be used. Each of the matched filters or correlators corresponds to one of the frames used to form the transmitted signal, and is used to estimate that frame from the received signal using the spreading sequence used to spread that frame.

Thus, in FIG. 18B, matched filter 184a is used to estimate auxiliary frame #0 using Spreading Sequence #0; matched filter 184b is used to estimate auxiliary frame #1 using Spreading Sequence #1; matched filter 184c is used to estimate auxiliary frame #2 using Spreading Sequence #2; matched filter 184d is used to estimate auxiliary frame #3 using Spreading Sequence #3; and matched filter 184e is used to estimate auxiliary frame #N–1 using Spreading Sequence #N–1.

As with the previous embodiment, frame errors in each of the frames can be detected and possibly corrected using optional error detection bits, such as CRC bits, appended to each of the frames. In addition, responsive to a suitable metric of the quality of the physical channel, such as FER or BER, selected ones of all of the auxiliary frames can be used to increase reliability of estimation of the original information bits.

Figure 18C:
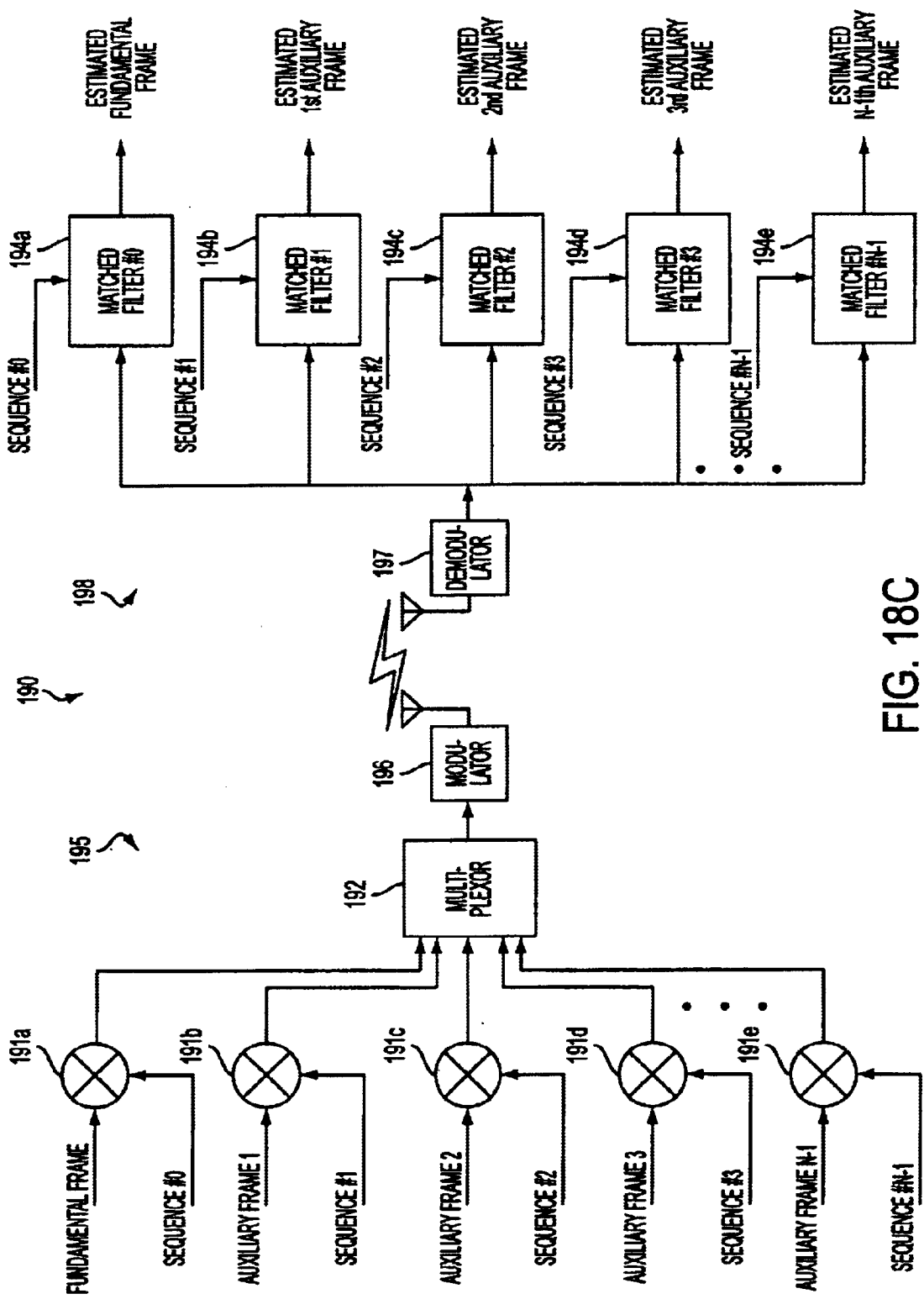
FIG. 18C illustrates a DSSS system in accordance with a third embodiment of the subject invention.

A third embodiment of the subject invention is illustrated in FIG. 18C. In this embodiment, unlike the previous embodiments, within receiver 195, signals representative of each of the fundamental and auxiliary frames are separately modulated and transmitted over the wireless interface. Thus, in FIG. 18C, a multiplexor 192 selectively provides one at a time each of the spread signals from spreaders 191a, 191b, 191c, 191d, and 191e to modulator 196 for transmission over the wireless interface.

Within the receiver 198, each of the signals is demodulated by demodulator 197 and the demodulated signal provided to each of the matched filters/correlators 194a, 194b, 194c, 194d, 194e whence the signal is processed as described earlier.

Each of the transmitted signals is processed in like manner to result in estimates of each of the fundamental and auxiliary frames. One or more of these frames is then used to estimate the original frame in the manner described previously.

FIGS. 19A–19B illustrate a first embodiment 200 of a method of transmitting information over a wireless interface in accordance with the subject invention. In step 201, a first frame of information is received. In step 202, a plurality of second frames is derived from the first frame. The second frames may include a frame of unencoded information bits from the first frame, or may comprise solely frames of encoded or parity bits derived from the information bits of the first frame.

In step 203, each of the second frames is spread, each using a distinct spreading sequence unique to the frame. In step 204, one or more signals are derived therefrom representative of each of the second frames. As discussed, each of the signals may represent a single frame or combined frames. In one embodiment, as discussed, a signal is separately provided for each of the frames. In another embodiment, also discussed, one signal is provided representing all the frames. In one implementation, this step includes the substep of modulating one or signals representative of the frames onto one or more signals at a desired carrier frequency. In step 205, the one or more signals are transmitted over the wireless interface.

In step 206, each of the one or more signals is received over the wireless interface. In step 207, estimates of one or more of the second frames are derived therefrom. In one implementation, this step is performed responsive to an indicator of physical channel quality. In one example, the number and type of second frames which are estimated is determined responsive to this indicator.

In one embodiment, as discussed, this step includes the substeps of demodulating each of the one or more signals, despreading the one or more signals using the spreading sequences employed at the transmitter, and integrating and sampling the despread information to estimate the bits comprising the second frames. Optionally, this step may also include the substep of detecting and/or correcting frame errors in the estimated second frames using CRC bits or the like appended thereto.

In step 208, the first frame is then estimated using one or more of the estimated second frames. In one implementation, this step is performed responsive to a metric, such as FER or BER, indicative of physical channel quality. In one embodiment, this step includes the substeps of decoding each of the auxiliary frames using a FEC decoder corresponding to the frame, and using the same to detect and/or correct bit errors in the fundamental frame. In another embodiment, this step involves simply decoding one or more of the auxiliary frames using the FEC decoders corresponding to each of the frames, and then deriving therefrom an estimate of the first frame.

A second embodiment 210 of a method of transmitting information over a wireless interface in accordance with the subject invention is illustrated in FIG. 19C. In step 211, a first frame of information is received. In step 212, a plurality of second frames is derived from the first frame. Again, the plurality of second frames may include a frame of unencoded information bits from the first frame, or may comprise solely frames of encoded information bits from the first frame or parity bits derived from the information bits in the first frame.

In step 213, each of the second frames is spread each with a spreading sequence unique to the frame. In step 214, one or more signals are derived therefrom representative of each of the second frames. Again, these signals may comprise a separate signal for each of the frames, one or more signals representing combinations of the frames, or a signal representing all the combined frames. In one implementation, this step includes the substep of modulating one or more signals onto a signal at a desired carrier frequency. In step 215, the one or more signals are transmitted over the wireless interface.

FIG. 19D illustrates an embodiment 220 of a method of receiving information over a wireless interface. In step 221, one or signals are received over a wireless interface representing a plurality of second frames. This step may involve separately receiving signals each representing one or combinations of the frames, or may involve representing a signal representing all the frames.

In step 222, estimates of one or more of the second frames are derived therefrom. In one implementation, this step is performed responsive to an indicator of physical channel quality. In one implementation example, this step includes the substeps of demodulating each of the one or more signals, despreading the signals using the spreading sequences employed in the transmitter, and then integrating and sampling the despread signals. It may also include the substep of detecting and/or correcting frame errors in the estimated second frames using CRC bits or the like appended to each of the frames.

In step 223, an estimate of the first frame is derived from one or more of the estimated second frames. In one implementation, this step is performed responsive to a metric, such as FER or BER, indicative of physical channel quality. In one embodiment, this step involves the substeps of decoding each of the auxiliary frames using corresponding FEC decoders, and then using the same to detect and/or correct bit errors in the fundamental frame. In another embodiment, this step involves the substeps of decoding each of the auxiliary frames using corresponding FEC decoders, such as a Viterbi decoder, and directly estimating therefrom the first frame.

The advantages of the invention are a system in which an increase in coding gain is possible without sacrificing processing gain.

Another advantage is that FEC coding schemes with different coding gains are available simultaneously, and can be selected frame by frame based on channel quality as determined by the receiver without the overhead of requests and acknowledgments over the data channel.

A further advantage is that the system of the invention will fit easily into existing systems employing DSSS technology and protocols, such as DCT products at 900 MHz, and 2.4 GHz WCDMA products.

An application of the invention is in a bad frame concealment or muting scheme in a digital voice transmission, e.g., ADPCM muting. Currently, when a bad frame is detected in such systems, it is simply muted. In a system configured in accordance with the subject invention, however, the fundamental frame can simply be, repeated as one of the auxiliary frames. Then, at the receiver, instead of simply muting the fundamental frame, the information bits may be recovered from the auxiliary frame.

Another application is in the area of asymmetric speech coding in which different words or speech segments have different levels of importance. In such an environment, it is redundant to protect unimportant speech with the same level of error control coding as important speech. In a system configured in accordance with the invention, the most important bits can be allocated to one of the auxiliary frames, and the less important bits can be placed in the fundamental frame. Then, the most important speech could benefit from the increased processing gain achievable in the auxiliary frames compared to the fundamental frame (see example below).

EXAMPLE

An advantage of the subject invention, compared to the conventional approach, is that any improvement in coding gain which results from using the various FEC coding schemes is achieved without sacrificing processing gain. Instead, the processing gain for each of the channels remains the same or improves.

To illustrate this, consider an example in which systematic block coders are employed to form the first and second auxiliary frames, and punctured convolutional encoders are employed to form third and fourth auxiliary frames.

In this example, the following assumptions are made about the conventional system:

| | |
|---|---|
| baseband information rate | x kbps |
| baseband parity bit rate | y kbps |
| code rate of FEC coder | x/ (x + y) |
| number of chips per bit | C |
| channel burst rate | (x + y) *C kbps |
| processing gain | 10 log C = PG dB |
| coding gain from parity bits | G0 dB |
| overall figure of merit | PG + G0 dB |

In the system configured in accordance with the subject invention, it is assumed that the channel burst rate is kept constant at $(x+y)*C$ kbps, and that the number of chips per bit is kept constant at C.

For the fundamental frame, the processing gain is 10 log C which equals PG.

The first auxiliary frame is assumed to be formed from the parity bits from the block coder used in the conventional system. It is assumed that y<x, and that each of the parity bits is repeated x/y times so that the size of the first auxiliary frame is the same as that of the fundamental frame. For this frame, the number of chips per bit is $(x/y)*C$, and thus the processing gain is 10 log $(x/y)*C$=10 log $(x/y)$+PG dB, which exceeds PG since x/y >1.

The second auxiliary frame is assumed to be formed from a systematic block coder in which the parity bit rate is k bps. It is assumed that k<x, and that each of the parity bits is repeated x/k times so that the size of the second auxiliary frame is the same as that of the fundamental frame. For this frame, the number of chips per bit is x/k, and thus the processing gain is 10 log $(x/k)*C$=10 log $(x/k)$+PG dB, which exceeds PG since x/k >1.

The third auxiliary frame is assumed to be formed by taking the even bits of a rate ½ convolutional encoder. For such an encoder, the number of chips per bitis C, and thus the processing gain is PG.

The fourth auxiliary frame is assumed to be formed by taking the odd bits of a rate ½ convolutional encoder. For such an encoder, the number of chips per bit is C, and thus the processing gain is PG.

In one example, it is assumed that:

x=40 y=8

C=11

PG=10.41 dB k=20

For this example, the processing gain for the conventional system is 10.41 dB and the coding gain is G0.

For the system configured in accordance with the invention, the processing gain for the first auxiliary frame is 17.39 dB, whereas the coding gain remains at G0.

The processing gain for the second auxiliary frame is 13.41 dB, and the coding gain is G1 which exceeds G0.

The processing gain for the third and fourth auxiliary frames is 10.41 dB, and the coding gain is G2 which exceeds G1 and therefore G0.

In this example, it can be seen that the frames comprising the parity bits from the block codings have gained heavily in terms of processing gain, while those comprising the bits from the convolutional codes have not increased at all in processing gain. However, due to the higher coding gain achieved from the convolutional codes compared to the block codes, it is expected that the overall figure of merit (the sum of the coding gain and processing gain, both in dB) will increase compared to the conventional system.

While embodiments, implementations, and implementation examples have been shown and described, it should be apparent to one of skill in the art that many more embodiments, implementations, and implementation examples are within the scope of the invention. Accordingly, the invention is not to be restricted except in light of the appended claims and their equivalents.

What is claimed is:

1. A direct sequence spread spectrum wireless communication system comprising:

a transmitter for (a) obtaining a first block of data, (b) deriving therefrom a plurality of substantially redundant second blocks, each of the second blocks derived at least in part using a different error correction code, (c) spreading each of the second blocks, each with a distinct spreading sequence, (d) deriving therefrom one or more signals representative of each of the second blocks, and (e) transmitting each of the one or more signals over a wireless interface; and a receiver for (a) receiving each of the one or more signals as transmitted over the wireless interface, (b) deriving therefrom estimates of one or more of the second blocks, and (c) estimating the first block from one or more of the estimated second blocks.

2. The system of claim 1 wherein signals representing each of the spread second blocks are separately modulated and transmitted over the wireless interface.

3. The system of claim 1 wherein signals representing each of the spread second blocks are combined and then modulated and transmitted over the wireless interface.

4. The system of claim 1 wherein one or more of the second blocks is all or a portion of the first block.

5. The system of claim 1 wherein one or more of the second blocks is encoded from the first block.

6. The system of claim 5 wherein one or more of the second blocks comprises parity bits encoded from the first block.

7. The system of claim 6 wherein the encoded bits are derived from a forward error correction (FEC) coder.

8. The system of claim 1 wherein one or more of the second blocks is appended with error detection bits.

9. The system of claim 8 wherein the error detection bits are CRC bits.

10. The system of claim 6 wherein two or more of the second blocks comprise encoded bits derived from different FEC coders.

11. The system of claim 10 wherein one of the FEC coders is a block coder, and the other of which is a convolutional encoder.

12. The system of claim 1 wherein the receiver estimates the first block responsive to an indicator of physical channel quality.

13. A transmitter configured for (a) obtaining a first block of data, (b) deriving therefrom a plurality of substantially redundant second blocks, each of the second blocks derived at least in part using a different error correction code, (c) spreading each of the second blocks, each with a distinct spreading sequence, (d) deriving therefrom one or more signals representative of each of the second blocks, and (e) transmitting each of the one or more signals over a wireless interface.

14. The transmitter of claim 13 wherein signals representing each of the spread second blocks are separately modulated and transmitted over the wireless interface.

15. The transmitter of claim 13 wherein signals representing each of the spread second blocks are combined and then modulated and transmitted over the wireless interface.

16. A receiver configured for (a) receiving one or more signals over a wireless interface representative of a plurality of substantially redundant second blocks, each of the second blocks associated with a different error correction code, (b) deriving therefrom estimates of one or more of the second blocks, and (c) estimating a first block from one or more of the estimated second blocks.

17. The receiver of claim 16 configured to estimate the first block responsive to an indicator of physical channel quality.

18. A method of transmitting information over a wireless interface comprising the steps of:

obtaining a first block of data;

deriving therefrom a plurality of substantially redundant second blocks, each of the second blocks derived at least in part using a different error correction code;

spreading each of the second blocks, each with a distinct spreading sequence;

deriving therefrom one or more signal representative of each of the second blocks;

transmitting each of the one or more signals over a wireless interface;

receiving each of the one or more signals as transmitted over the wireless interface;

deriving therefrom estimates of one or more of the second blocks; and estimating the first block from one or more of the estimated second blocks.

19. The method of claim 18 further comprising separately modulating and transmitting over the wireless interface signals representing each of the second blocks.

20. The method of claim 18 further comprising combining signals representing each of the second blocks, and then modulating and transmitting over the wireless interface the combined signal.

21. The method of claim 18 wherein one or more of the second blocks comprise all or a portion of the first block.

22. The method of claim 18 wherein one or more of the second blocks is encoded from the first block.

23. The method of claim 22 wherein one or more of the second blocks comprise parity bits encoded from the first block.

24. The method of claim 22 wherein one or more of the second blocks is encoded using a forward error correction (FEC) coder.

25. The method of claim 18 wherein one or more of the second blocks is appended with error detection bits.

26. The method of claim 25 wherein the error detection bits are CRC bits.

27. The method of claim 23 wherein two or more of the second blocks are encoded using different FEC coders.

28. The method of claim 27 wherein one of the FEC coders is a block coder, and the other of which is a convolutional encoder.

29. The method of claim 18 wherein the step of estimating the first block is performed responsive to an indicator of physical channel quality.

30. A method of transmitting information over a wireless interface comprising the following steps:

obtaining a first block of data;

deriving therefrom a plurality of substantially redundant second blocks, each of the second blocks derived at least in part using a different error correction code;

spreading each of the second blocks, each with a distinct spreading sequence;

deriving therefrom one or more signals representative of each of the second blocks; and transmitting each of the one or more signals over a wireless interface.

31. The method of claim 30 further comprising separately modulating and transmitting signals representative of each of the spread second blocks over the wireless interface.

32. The method of claim 30 further comprising combining signals representative of each of the spread second blocks, and then modulating and transmitting the same over the wireless interface.

33. A method of receiving information over a wireless interface comprising the following steps:

receiving over a wireless interface one or more signals representative of a plurality of substantially redundant second blocks as transmitted over the wireless interface, each of the second blocks associated with a different error correction code;

deriving therefrom estimates of one or more of the second blocks; and estimating a first block from one or more of the estimated second blocks.

34. A direct sequence spread spectrum wireless communication system comprising:

transmitting means for (a) obtaining a first block of data, (b) deriving therefrom a plurality of substantially redundant second blocks, each of the second blocks derived at least in part using a different error correction code, (c) spreading each of the second blocks, each with a distinct spreading sequence, (d) deriving therefrom one or more signals representative of each of the second blocks, and (e) transmitting each of the one or more signals over a wireless interface; and receiving means for (a) receiving each of the one or more signals as transmitted over the wireless interface, (b) deriving therefrom estimates of one or more of the second blocks, and (c) estimating the first block from one or more of the estimated second blocks.

35. A transmitter comprising transmitting means for (a) obtaining a first block of data, (b) deriving therefrom a plurality of substantially redundant second blocks, each of the second blocks derived at least in part using a different error correction code; (c) spreading each of the second blocks, each with a distinct spreading sequence, (d) deriving therefrom one or more signals representative of each of the second blocks, and (e) transmitting each of the one or more signals over a wireless interface.

36. A method of transmitting information over a wireless interface comprising the steps of:

a step for obtaining a first block of data;

a step for deriving therefrom a plurality of substantially redundant second blocks, each of the second blocks derived at least in part using a different error correction code;

a step for spreading each of the second blocks, each with a distinct spreading sequence;

a step for deriving therefrom one or more signal representative of each of the second blocks;

a step for transmitting each of the one or more signals over a wireless interface;

a step for receiving each of the one or more signals as transmitted over the wireless interface;

a step for deriving therefrom estimates of one or more of the second blocks; and a step for estimating the first block from one or more of the estimated second blocks.

37. A method of transmitting information over a wireless interface comprising the following steps:

a step for obtaining a first block of data;

a step for deriving therefrom a plurality of substantially redundant second blocks, each of the second blocks derived at least in part using different error correction codes;

a step for spreading each of the second blocks, each with a distinct spreading sequence;

a step for deriving therefrom one or more signals representative of each of the second blocks; and a step for transmitting each of the one or more signals over a wireless interface.

* * * * *